US006172801B1

(12) United States Patent
Takeda et al.

(10) Patent No.: US 6,172,801 B1
(45) Date of Patent: Jan. 9, 2001

(54) OPTICAL AMPLIFIER, OPTICAL AMPLIFYING APPARATUS, OPTICAL TRANSMITTER FOR USE IN OPTICAL COMMUNICATIONS SYSTEM, AND OPTICAL SURGE SUPPRESSION METHOD FOR THE OPTICAL AMPLIFIER

(75) Inventors: Miki Takeda; Susumu Kinoshita, both of Kawasaki (JP)

(73) Assignee: Fujitsu Limited, Kawasaki (JP)

(*) Notice: Under 35 U.S.C. 154(b), the term of this patent shall be extended for 0 days.

(21) Appl. No.: 08/925,917

(22) Filed: Sep. 9, 1997

(30) Foreign Application Priority Data

Jan. 14, 1997 (JP) ........................................ 9-005062

(51) Int. Cl.$^7$ ................... H01S 3/06; G02B 6/26
(52) U.S. Cl. ................... 359/337; 359/341; 359/346; 372/6
(58) Field of Search ................... 359/337, 340, 359/341, 346; 372/6, 18

(56) References Cited

U.S. PATENT DOCUMENTS

| | | | |
|---|---|---|---|
| 5,537,244 | * 7/1996 | Fukushima et al. | 359/341 |
| 5,570,227 | * 10/1996 | Nabeyama et al. | 359/341 |
| 5,633,749 | * 5/1997 | Shibuya et al. | 359/341 |
| 5,647,038 | * 7/1997 | Minden et al. | 385/37 |
| 5,790,722 | * 8/1998 | Minden et al. | 385/27 |

FOREIGN PATENT DOCUMENTS

| | | |
|---|---|---|
| 264230 | * 4/1988 | (EP) . |
| 2289586 | 11/1995 | (GB) . |
| 2301723 | 11/1996 | (GB) . |
| 23044852 | 3/1997 | (GB) . |
| 2308222 | 6/1997 | (GB) . |
| WO 95/22847 | 8/1995 | (WO) . |

OTHER PUBLICATIONS

Tanaka et al, IEEE/Lasers & Electro Optics Society Jan. 1991 Tech. Digest, vol. 13, pp. 156–159, Jul. 26, 1991.*
Ogoshi et al, Technical Report IBICE, 96–39, pp. 1–7, 1996.*
Yoshinoga et al, Journal Lightwave Tech. vol. 10, #8, p. 1132–6, Aug. 1992.*

* cited by examiner

Primary Examiner—Nelson Moskowitz
(74) Attorney, Agent, or Firm—Staas & Halsey, LLP

(57) ABSTRACT

There is disclosed a technique regarding an optical amplifier in an optical communications system. In order to effectively suppress optical surges during amplification of signal light, through a simple structure, there is provided an amplifying medium which amplifies input light and outputs the amplified light, and reflecting members are connected to the input and output sides of the amplifying medium. The reflecting members can reflect light with a predetermined optical wavelength different from a signal light wavelength contained in the input light.

33 Claims, 35 Drawing Sheets

FIG. 6

| Center wavelength (nm) | 1531.0 |
|---|---|
| Bandwidth (nm) | 20.0 |
| Attenuation (dB)<br>at $\lambda <$ 1538 nm<br>at $\lambda <$ 1532 nm | $>$ 21.0<br>$>$ 25.0 |
| Fiber type | Corning SMF-28 |

FIG. 9

| Dynamic Range | >30 | dB |
|---|---|---|
| Wavelength Range | 1.2 to 1.6 | $\mu$m |
| Insertion Loss | <2.5 | dB |
| Resolution | better than 0.2 | dB |
| Backreflection | standard     <−23 | dB |
| | low     <−40 | dB |

LONGITUDINAL-MODE STANDING WAVE
(WHEN REFLECTANCES AT OPPOSITE ENDS ARE RIGHT)

LONGITUDINAL-MODE RESONANCE SPECTRUM
(SPECTRAL SPREAD OF ONE MODE IS DETERMINED DEPENDING ON Q OF RESONATOR)

FIG. 17

| CONDITIONS | AMOUNT OF OPTICAL SURGE | POINT |
|---|---|---|
| (1) OSCILLATION DOES NOT OCCUR EVEN WHEN INPUT DECREASES | $\Delta + \beta + \gamma$ | • OPTICAL SURGE GENERATES AT MAXIMUM RATE |
| (2) OSCILLATION OCCURS WHEN INPUT DECREASES | $\Delta + \beta$ | • INCREASE OF GAIN IS PREVENTED BY OSCILLATION |
| (3) REFLECTANCE IS INCREASED AT SIGNAL WAVELENGH | $\Delta$ | • GAIN INCREASE IS SMALLER THAN THAT IN CASE (2)<br>• OSCILLATION ON/OFF MARGIN (FIG.14 : 7.3dB IN EXPERIMENT) |
| (4) REFLECTANCE IS INCREASED AT WAVELENGTH AT WHICH SMALL-SIGNAL GAIN BECOMES GREATER THAN THAT AT SIGNAL WAVELENGTH | $\Delta - \alpha$ | • GAIN INCREASE IS FURTHER REDUCED COMPARED TO CASE (3) |

INPUT WAVEFORM

OUTPUT WAVEFORM IN CASE (1)

OUTPUT WAVEFORM
IN CASE (4)

F I G. 24
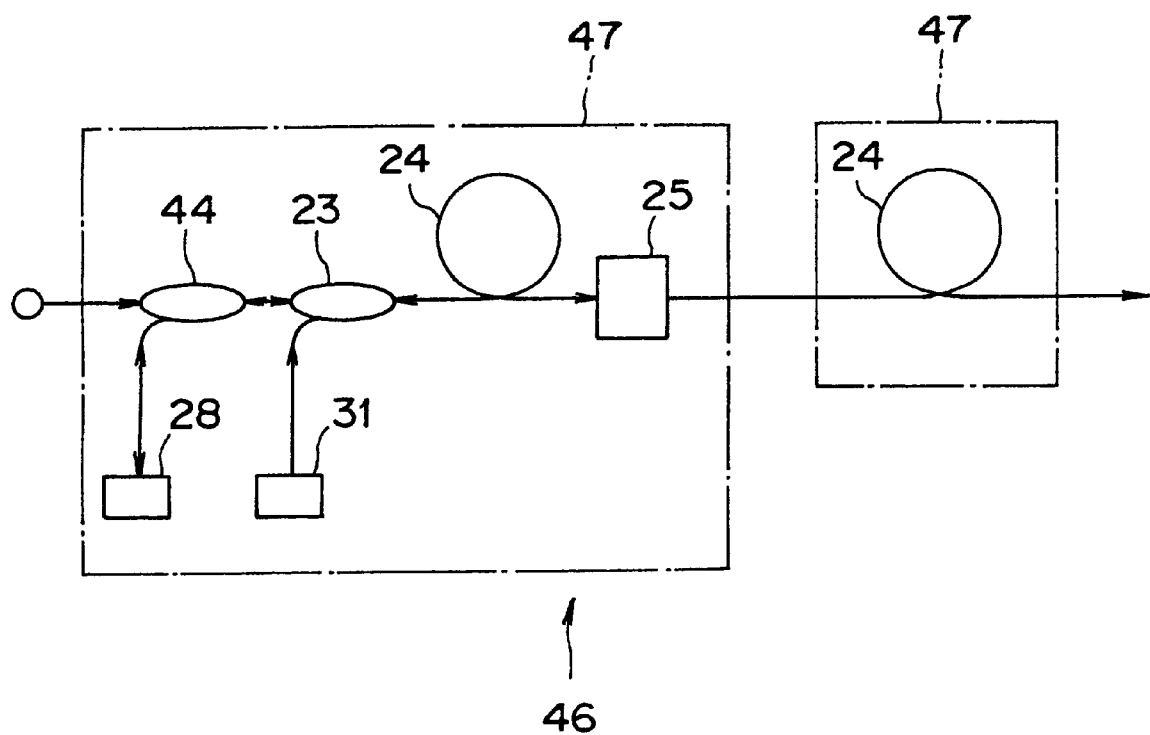

OPTICAL AMPLIFIER, OPTICAL AMPLIFYING APPARATUS, OPTICAL TRANSMITTER FOR USE IN OPTICAL COMMUNICATIONS SYSTEM, AND OPTICAL SURGE SUPPRESSION METHOD FOR THE OPTICAL AMPLIFIER

BACKGROUND OF THE INVENTION (1) Field of the Invention

The present invention relates to an optical amplifier, an optical amplifying apparatus, an optical transmitter for use in an optical communications system, and an optical surge suppression method for the optical amplifier, which are suitable for amplifying signal light while suppressing optical surge in, for example, an optical communication system.

(2) Description of the Related Art

Recent vigorous research and development effects directed towards optical communications systems have clarified the importance of development of optical amplifiers, such as booster amplifiers, repeaters, or preamplifiers, through utilization of techniques related to optical amplifiers which use rare-earth-element-doped fibers such as erbium(Er)-doped fibers.

As a result of the emergence of optical amplifiers, a transmission system in which signal light is relayed many times through use of optical amplifiers has received attention, as it largely contributes to economizing communications systems in the multimedia age.

Optical amplifiers generally fall into two broad categories: optical fiber amplifiers and semiconductor-type amplifiers.

The optical amplifier has an optical fiber whose core portion is doped with a rare earth element such as erbium (Er). When input light and pumping light enter the optical fiber at the same time, the optical amplifier amplifies the input light through use of the energy of the pumping light. Examples of this type of optical fiber amplifier include an erbium(Er)-doped fiber optical amplifier and a praseodymium(Pr)-doped fiber optical amplifier.

In the semiconductor-type amplifier, when a semiconductor laser is excited by injection of carriers, input light is amplified through use of the resultant excitation energy. A traveling-wave semiconductor amplifier is an example of the semiconductor-type amplifier.

However, in the above-described optical amplifier, when signals are cut off, no input light is input to the optical amplifier. In a case where there is no input light and therefore the input power is low, the optical amplifier outputs light having an extremely low output intensity (indicated by M in FIG. 35) as compared to a steady-state output level.

When no input light exists in the optical amplifier, the gain of the optical amplifier recovered from a saturated level, and hence the optical amplifier is in a high-gain state.

If after completion of interruption of signal inputs there is an input of an signal light in the form of a waveform having a sharp rising edge when the optical amplifier is in such a high-gain state, the optical amplifier amplifies the rising edge of the optical signal with a high gain. As a result, a spike (optical surge) is generated in an optical output as indicated by S in FIG. 35.

If such an optical surge is generated in the optical amplifier used in the optical transmission system, it is amplified and relayed cumulatively by other relay amplifiers through the transmission line. Eventually, a terminal station receives signal light together with a much higher optical surge, thereby adversely affecting the quality of optical components at a receiving section.

Specifically, the generation of optical surges results in an increase in the intensity (optical level) of signal light input to an optical component, such as a photodiode, which serves as a light-receiving element for receiving the signal light at the receiving section. This overloads the optical component or a receiving circuit to such an extent as to exceed their tolerances. In some cases, the optical component or the receiving circuit may be damaged by the overload.

SUMMARY OF THE INVENTION

The present invention has been conceived in view of the foregoing drawbacks in the related art, and an object of the present invention is to provide, by means of a simple configuration, an optical amplifier, an optical amplifying apparatus, an optical transmitter for use in an optical communications system, and an optical surge suppression method for use with the optical amplifier, all of which are capable of effectively suppressing optical surges that result from light being input in the form of a waveform having a sharp rising edge after completion of the period during which the power of the input light is low.

To these ends, the present invention provides an optical amplifier comprising: an amplifying medium which amplifies input light and outputs the amplified light; and reflecting members which are connected to the input and output sides of the amplifying medium and are capable of reflecting light with a predetermined optical wavelength different from a signal wavelength contained in the input light.

Thus, the optical amplifier of the present invention is provided with the amplifying medium which amplifies input light and outputs the amplified light, and the reflecting members which are connected to the input and output sides of the amplifying medium and are capable of reflecting light with a predetermined optical wavelength different from a signal wavelength contained in the input light. If there is a reduction in the intensity of the input light, the saturation of gain of the amplifying medium is mitigated, enabling the optical amplifier to produce oscillated light before the gain increases again.

As a result, an increase in the gain of the amplifying medium due to the reduction in the intensity of the input light is suppressed, and optical surges that develop when an abrupt increase occurs in the signal light intensity can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

An optical amplifier of the present invention having an amplifying medium for amplifying input light through use of the excitation energy of pumping light and for outputting the amplified light comprises: a pumping light source for generating the pumping light; a pumping light incident coupler which introduces the pumping light emitted from the pumping light source into one end of the amplifying medium; reflecting members which are respectively connected to the input and output sides of the amplifying medium and are capable of reflecting light with a predetermined optical wavelength different from a signal wavelength contained in the input light; and a branch coupler branching an optical signal received from the amplifying medium, the branch coupler being interposed between the amplifying medium and one of the reflecting members, either that connected to the input side of the amplifying medium or that connected to the output side.

As described above, the optical amplifier of the present invention having an amplifying medium for amplifying input light through use of the excitation energy of pumping light and for outputting the amplified light comprises a pumping light source for generating the pumping light, a pumping light incident coupler which introduces the pumping light emitted from the pumping light source into one end of the amplifying medium, reflecting members which are respectively disposed on the input and output sides of the amplifying medium and are capable of reflecting light with a predetermined optical wavelength different from the signal wavelength contained in the input light, and a branch coupler for branching an optical signal received from the amplifying medium to branch, the branch coupler being interposed between the amplifying medium and one of the reflecting members, either that connected to the input side of the amplifying medium or that connected to the output side. When there is a reduction in the intensity of input light, the saturation of gain of the amplifying medium is mitigated, enabling oscillated light to be produced before the gain increases again.

As a result, an increase in the gain of the amplifying medium due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

Further, an optical amplifier of the present invention having an amplifying medium for amplifying input light through use of the excitation energy of pumping light and for outputting the amplified light comprises: a pumping light source for generating the pumping light; a pumping light incident coupler which introduces the pumping light emitted from the pumping light source into one end of the amplifying medium; a branch coupler connected to the input side of the amplifying medium for causing an optical signal sent to the amplifying medium to branch so as to be output as a first branch signal and for causing an optical signal received from the amplifying medium to branch so as to be output as a second branch signal; reflecting members capable of reflecting light with a predetermined optical wavelength different from a signal wavelength contained in the input light, one of which is connected to the input side of the amplifying medium with the branch coupler interposed between them, and the other one of which is connected to the output side of the amplifying medium; an input monitor for monitoring the light input to the amplifying medium on the basis of the first branch signal received from the branch coupler; and a variable attenuator for attenuating the second branch signal received from the branch coupler to a predetermined level and for outputting the attenuated second branch signal to the reflecting member disposed on the side of the branch coupler, wherein, if the intensity of the input light decreases to a value lower than a preset threshold value, the amount of attenuation of the second branch signal at the variable attenuator is controlled on the basis of input light monitor information received from the input monitor in such a way that the gain of the amplifying medium decreases to a value lower than a predetermined value.

According to the present invention, if the intensity of the input light decreases to a value lower than a preset threshold value, the optical amplifier controls the amount of attenuation of the second branch signal on the basis of input light monitor information received from the input monitor in such a way that the gain of the amplifying medium decreases to a value lower than a predetermined value. When it is judged based on the input light monitor information that there is a reduction in the intensity of input light, the saturation of gain of the amplifying medium is mitigated, enabling oscillated light to be produced before the gain increases again.

As a result, an increase in the gain of the amplifying medium due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

Further, an optical amplifier of the present invention having an amplifying medium for amplifying input light through use of the excitation energy of pumping light and for outputting the amplified light comprises: a pumping light source for generating the pumping light; a pumping light incident coupler which introduces the pumping light emitted from the pumping light source into one end of the amplifying medium; a first branch coupler connected to the input side of the amplifying medium for causing an optical signal sent to the amplifying medium to branch so as to be output as a first branch signal; a second branch coupler connected to the output side of the first branch coupler for causing an optical signal received from the amplifying medium to branch so as to be output as a second branch signal; reflecting members capable of reflecting light with a predetermined optical wavelength different from a signal wavelength contained in the input light, one of which is connected to the input side of the amplifying medium with the second branch coupler interposed between them, and the other one of which is connected to the output side of the amplifying medium; an input monitor for monitoring the light input to the amplifying medium on the basis of the first branch signal received from the first branch coupler; and a variable attenuator for attenuating the second branch signal received from the second branch coupler to a predetermined level and for outputting the attenuated second branch signal to the reflecting member disposed on the side of the second branch coupler, wherein, if the intensity of the input light decreases to a value lower than a preset threshold value, the amount of attenuation of the second branch signal at the variable attenuator is controlled on the basis of input light monitor information received from the input monitor in such a way that the gain of the amplifying medium decreases to a value lower than a predetermined value.

According to the present invention, if the intensity of the input light decreases to a value lower than a preset threshold value, the optical amplifier controls the amount of attenuation of the second branch signal at the variable attenuator on the basis of input light monitor information received from the input monitor in such a way that the gain of the amplifying medium decreases to a value lower than a predetermined value. When it is judged based on the input light monitor information that there is a reduction in the intensity of input light, the saturation of gain of the amplifying medium is mitigated, enabling oscillated light to be produced before the gain increases again.

As a result, an increase in the gain of the amplifying medium due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

The present invention provides an optical amplifying apparatus including at least two stages of optical amplifiers, each of which has an amplifying medium for amplifying input light through use of the excitation energy of pumping light and for outputting the amplified light, the improvement being characterized by the fact that the optical amplifier provided in the first stage comprises: a pumping light source for generating the pumping light; a pumping light incident coupler which introduces the pumping light emitted from the pumping light source into one end of the amplifying medium; a branch coupler connected to at least one of the input and output sides of the amplifying medium for causing an optical signal received from the amplifying medium to branch; reflecting members which are respectively connected to the input and output sides of the amplifying medium and are capable of reflecting light with a predetermined optical wavelength different from a signal wavelength contained in the input light while the branch coupler is interposed between the input or output side of the amplifying medium and one of the reflecting member; and the reflecting member connected to the input side of the amplifying medium having a reflectance higher than that of the reflecting member connected to the output side of the amplifying medium.

The optical amplifying apparatus of the present invention including at least two stages of optical amplifiers, each of which has an amplifying medium for amplifying input light through use of the excitation energy of pumping light and for outputting the amplified light, is capable of preventing propagation of optical surges to the optical amplifiers in the subsequent stages by suppressing optical surges that occur in the optical amplifier in the first stage. Further, the amplifying apparatus is capable of propagating oscillated light output from the optical amplifier in the first stage to the optical amplifiers in the subsequent stages successively, and hence optical surges can be prevented from occurring in the optical amplifiers in the subsequent stages.

As a result, an increase in the gain of the amplifying medium due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

An optical transmitter for use in an optical communications system which outputs an optical signal amplified by an optical output amplifier, the improvement being characterized by the fact that the optical output amplifier comprises: an amplifying medium for amplifying input light through use of the excitation energy of pumping light and for outputting the amplified light; a pumping light source for generating the pumping light; a pumping light incident coupler which introduces the pumping light emitted from the pumping light source into one end of the amplifying medium; a branch coupler for causing bifurcation of an optical signal received from the amplifying medium which is connected to the input side of the amplifying medium or to the output side thereof; and reflecting members which are respectively connected to the input and output sides of the amplifying medium and are capable of reflecting light with a predetermined optical wavelength different from a signal wavelength contained in the input light while the branch coupler is interposed between one of the reflecting members and the input or output side of the amplifying medium.

According to the present invention, the optical transmitter for use with the optical communications system that outputs an optical signal amplified by an optical output amplifier is capable of pre venting propagation of optical surges to the optic al amplifiers in the subsequent stages by suppressing optical surges that occur i n the optical output amplifier. Further, the amplifying apparatus is capable e of propagating oscillated l light output from the optical output amplifier to optical amplifiers i n the subsequent stages successively, and hence optical surges can be prevented from occurring in the optical amplifiers in the subsequent stages.

As a result, an increase in the gain of the amplifying medium due to the reduction in the intensity of the input light is suppressed, and optical surges that develop when an abrupt increase occurs in t he signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

A method of suppressing occurrence of optical surges in an optical amplifier is characterized by discharging excitation energy accumulated in an amplifying medium by oscillating light with a wavelength different from a signal wavelength contained in input light if there is a reduction in the intensity of the input light, in order to suppress optical surges in an optical signal output from an optical amplifier having the amplifying medium which amplifies the input light containing signal light and outputs the amplified light.

By the method of suppressing occurrence of optical surges in an optical amplifier according to the present invention, excitation energy accumulated in an amplifying medium is discharged by oscillating light with a wavelength different from the signal wavelength contained in input light if there is a reduction in the intensity of the input light, in order to suppress optical surges in an optical signal output from an optical amplifier having the amplifying medium which amplifies the input light containing signal light and outputs the amplified light. As a result, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

BRIEF DESCRIPTION OF THE DRAWINGS

FIG. 6 is a table presenting the characteristics of the fiber grating used in the optical amplifier of the first embodiment of the present invention;

FIG. 9 is a table illustrating the characteristics of the variable optical attenuator used in the optical amplifier of the first embodiment of the present invention;

FIG. 17 is an illustrative plot for explaining an effect of suppressing occurrence of optical surges in the optical amplifier of the first embodiment of the present invention;

FIG. 24 is block diagram illustrating another configuration of an optical amplifying apparatus used in the optical communications system shown in FIG. 4;

DESCRIPTION OF THE PREFERRED EMBODIMENTS (a) Description of Aspect of the Present Invention First, one aspect of the present invention will be described in reference to the accompanying drawings.

Figure 1:
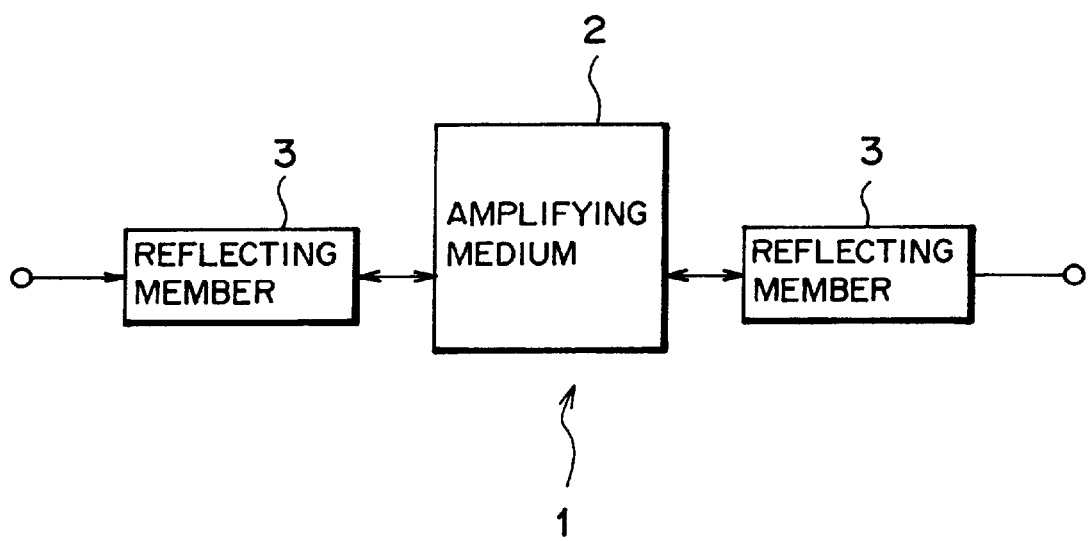
FIG. 1 is a block diagram illustrating one aspect of the configuration of an optical amplifier according to the present invention.

FIG. 1 is a block diagram illustrating one aspect of the configuration of an optical amplifier according to the present invention. An optical amplifier 1 shown in FIG. 1 is comprised of an amplifying medium 2 which amplifies input light and outputs the amplified light, and reflecting members 3 which are respectively connected to the input and output sides of the amplifying medium 2 and are capable of reflecting light that has a predetermined optical wavelength different from a signal wavelength contained in the input light.

With the foregoing configuration, the optical amplifier 1 of the present invention is capable of mitigating the saturation of gain of the amplifying medium 2 if there is a reduction in the intensity of the input light, and is also capable of generating oscillated light before the gain increases again.

As a result, an increase in the gain of the amplifying medium 2 due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

Figure 2:
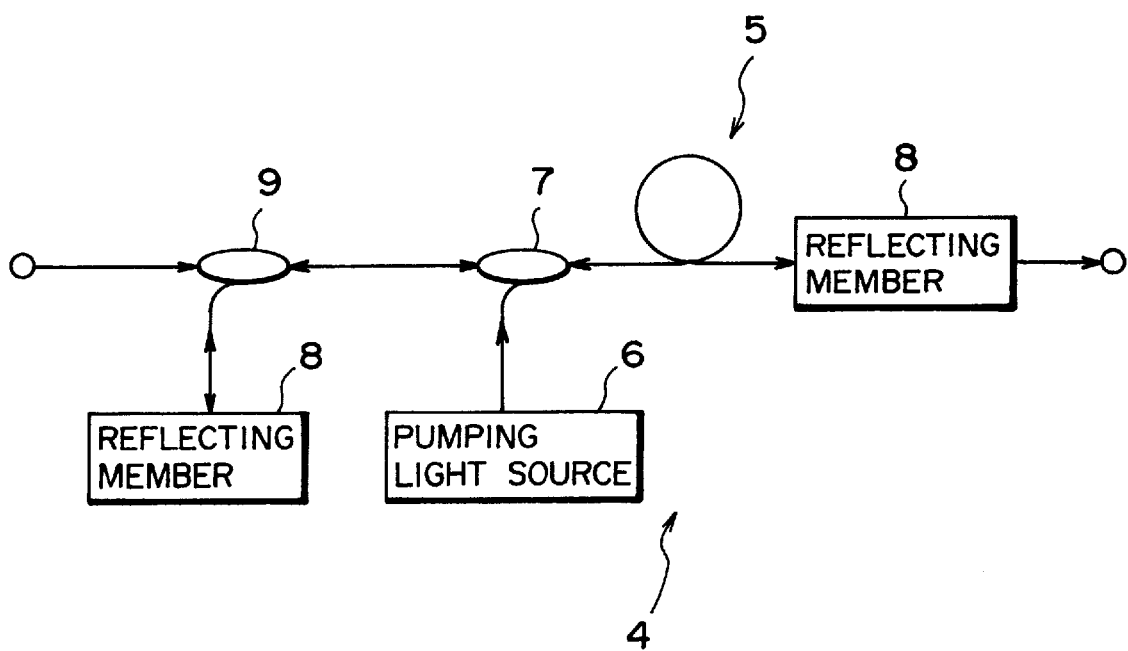
FIG. 2 is a block diagram illustrating another aspect of the configuration of an optical amplifier according to the present invention.

FIG. 2 is a block diagram illustrating another aspect of the configuration of the optical amplifier according to the present invention. An optical amplifier 4 shown in FIG. 2 is comprised of an amplifying medium 5, a pumping light source 6, a pumping light incident coupler 7, reflecting members 8, and a branch coupler 9.

The pumping light source 6 generates pumping light, while the pumping light incident coupler 7 causes the pumping light from the pumping light source 6 to enter one end of the amplifying medium 5.

The amplifying medium 5 amplifies input light through utilization of excitation energy of the pumping light and outputs the amplified light.

The reflecting members 8 are respectively connected to the input and output sides of the amplifying medium 5 and are capable of reflecting light that has a predetermined optical wavelength different from the signal wavelength and is contained in the input light.

The branch coupler 9 is interposed between the amplifying medium 5 and one of the reflecting members 8, either that is connected to the input side of the amplifying medium 5 or that is connected to the output side of the amplifying medium 5, and causes an optical signal received from the amplifying medium 5 to branch.

In the optical amplifier 4, the reflectances of the reflecting members 8 connected to the input and output sides of the amplifying medium 5 are set such that the amplifying medium 5 has a gain that enables suppression of optical surges. At this time, the reflectance of the reflecting member 8 connected to the input side of the amplifying medium 5 may be set so as to become higher than that of the reflecting member 8 connected to the output side of the amplifying medium 5.

Alternatively, in order that the amplifying medium 5 has a gain that enables suppression of optical surges, there may be provided an attenuator which attenuates the optical signal bifurcated by the branch coupler 9 to a predetermined level and outputs the attenuated optical signal to the reflecting member 8 that is disposed on the side of the branch coupler 9. In this case, the attenuator may be formed from a variable attenuator.

The pumping light incident coupler 7 may be formed from a wavelength division multiplexing coupler.

The amplifying medium 5 may be formed from rare-earth-element-doped fibers. The rare-earth-element-doped fibers can be made from an erbium-doped fiber.

The branch coupler 9 may be formed from a wavelength division multiplexing coupler which separates light with a signal light wavelength, through wavelength division multiplexing, from light with a predetermined optical wavelength that is reflected by the reflecting member 8.

With the foregoing configuration, the optical amplifier 4 of the present invention is capable of mitigating the saturation of gain of the amplifying medium 5 if there is a reduction in the intensity of the input light, and is also capable of generating oscillated light before the gain increases again.

As a result, an increase in the gain of the amplifying medium 5 due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

In this case, if the reflectance of the reflecting member 8 connected to the input side of the amplifying medium 5 is set so as to become higher than that of the reflecting member 8 connected to the output side of the amplifying medium 5, it is possible to cause the optical amplifier 4 to output the light resonated in the optical amplifier 4, and this oscillated light travels to the optical amplifiers in the subsequent stages. As a result, the generation of optical surges in the optical amplifiers in the subsequent stages can be suppressed.

If the branch coupler 9 is made up of a wavelength division multiplexing coupler which separates light with a signal light wavelength, through wavelength division multiplexing, from light with a predetermined optical wavelength that is reflected by the reflecting member 8, the oscillated light resonated in the optical amplifier can be prevented from emerging from an input port of the optical amplifier 4. Further, a noise factor of the optical amplifier 4 can be reduced by decreasing an insertion loss at the signal light wavelength.

Further, an optical amplifier of the present invention having an amplifying medium for amplifying input light through use of the excitation energy of pumping light and for outputting the amplified light is characterized by comprising: a pumping light source for generating the pumping light; a pumping light incident coupler which introduces the pumping light emitted from the pumping light source into one end of the amplifying medium; a branch coupler connected to the input side of the amplifying medium for causing an optical signal sent to the amplifying medium to branch so as to be output as a first branch signal and for causing an optical signal received from the amplifying medium to branch so as to be output as a second branch signal; reflecting members capable of reflecting light with a predetermined optical wavelength different from a signal wavelength contained in the input light, one of which is connected to the input side of the amplifying medium with the branch coupler interposed between them and the other one of which is connected to the output side of the amplifying medium; an input monitor for monitoring the light input to the amplifying medium on the basis of the first branch signal received from the branch coupler; and a variable attenuator for attenuating the second branch signal received from the branch coupler to a predetermined level and for outputting the attenuated second branch signal to the reflecting member disposed on the side of the branch coupler, wherein, if the intensity of the input light decreases to a value lower than a preset threshold value, the amount of attenuation of the second branch signal at the variable attenuator is controlled on the basis of input light monitor information received from the input monitor in such a way that the gain of the amplifying medium decreases to a value lower than a predetermined value.

The optical amplifier may be provided with a filter for permitting transmission of only light with the signal light wavelength included in the first branch signal received from the branch coupler and outputting the light to the input monitor.

If the intensity of the input light decreases to a value lower than a predetermined threshold value, the optical amplifier of the present invention controls the amount of attenuation of the second branch signal at the variable attenuator such that the gain of the amplifying medium becomes lower than a predetermined value on the basis of input light monitor information received from the input monitor. With this arrangement, if on the basis s of the input light monitor information received from the input monitor it is determined that there is a reduction in the intensity of the input light, the saturation of gain of the amplifying medium is mitigated and oscillated light can be generated before the gain increases again.

As a result, an increase in the gain of the amplifying medium due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

If the amplifier is provided with a filter which permits passage of only light with the signal light wavelength contained in the first branch signal and outputs this light to the input monitor, a portion of the oscillated light output from the branch coupler is prevented from entering the input monitor, and hence the deterioration of accuracy of the input monitor can be prevented.

Further, an optical amplifier of the present invention having an amplifying medium for amplifying input light through use of the excitation energy of pumping light and for outputting the amplified light comprises: a pumping light source for generating the pumping light; a pumping light incident coupler which introduces the pumping light emitted from the pumping light source into one end of the amplifying medium; a first branch coupler disposed on the input side of the amplifying medium for causing an optical signal sent to the amplifying medium to branch so as to be output as a first branch signal; a second branch coupler disposed on the output side of the first branch coupler for causing an optical signal received from the amplifying medium to branch so as to be output as a second branch signal; reflecting members capable of reflecting light with a predetermined optical wavelength different from a signal wavelength contained in the input light, one of which is connected to the input side of the amplifying medium with the second branch coupler interposed between them, and the other one of which is connected to the output side of the amplifying medium with the second branch coupler interposed between them, an input monitor for monitoring the light input to the amplifying medium on the basis of the first branch signal received from the first branch coupler; and a variable attenuator for attenuating the second branch signal received from the second branch coupler to a predetermined level and for outputting the attenuated second branch signal to the reflecting member disposed on the side of the second branch coupler, wherein, if the intensity of the input light decreases to a value lower than a preset threshold value, the amount of attenuation of the second branch signal at the variable attenuator is controlled on the basis of input light monitor information received from the input monitor in such a way that the gain of the amplifying medium decreases to a value lower than a predetermined value.

The second branch coupler may be formed from a wavelength division multiplexing coupler which separates light with a signal light wavelength, through wavelength division multiplexing, from light with a predetermined optical wavelength that is reflected by the reflecting member.

If the intensity of the input light decreases to a value lower than a preset threshold value, the optical amplifier of the present invention controls the amount of attenuation of the second branch signal at the variable attenuator, on the basis of input light monitor information received from the input monitor, in such a way that the gain of the amplifying medium decreases to a value lower than a predetermined value. With this arrangement, if on the basis of the input light monitor information received from the input monitor it is determined that there is a reduction in the intensity of the input light, and the gain saturation of the amplifying medium is mitigated, oscillated light can be generated before the gain increases again.

As a result, an increase in the gain of the amplifying medium due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

If the second branch coupler is formed from a wavelength division multiplexing coupler which separates light with a signal light wavelength, through wavelength division multiplexing, from light with a predetermined optical wavelength that is reflected by the reflecting member, the oscillated light resonated in the optical amplifier can be prevented from emerging from an input port of the optical amplifier. Further, a noise factor of the optical amplifier can be reduced by decreasing an insertion loss related to the signal light wavelength.

In the previously described optical amplifier, in the case of input light having a low power level, the gain at an optical wavelength that is reflected by the reflecting member may be set higher than the gain at the signal light wavelength.

In the above-described optical amplifier, the reflecting member may be formed from fiber gratings.

Further, in the optical amplifier, the input and output ports which permit the input and output of light may be each provided with an isolator. With these arrangements, the power-branched light can be prevented from emerging from the optical amplifier via the input port, and the light output from the optical amplifier via the output port can be prevented from re-entering the optical amplifier.

In the previously described optical amplifier, there may be attached to the light output port a filter which permits passage of only light with the signal light wavelength by eliminating light with the optical wavelength that is reflected by the reflecting member, whereby the oscillated light generated to prevent optical surges can be prevented from emerging from the optical amplifier.

Further, the present invention provides an optical amplifying apparatus including at least two stages of optical amplifiers, each of which has an amplifying medium for amplifying input light through use of the excitation energy of pumping light and for outputting the amplified light. The optical amplifier provided in the first stage comprises a pumping light source for generating the pumping light; a pumping light incident coupler which introduces the pumping light emitted from the pumping light source into one end of the amplifying medium; a branch coupler connected to at least one of the input and output sides of the amplifying medium for causing an optical signal received from the amplifying medium to branch; and reflecting members which are respectively connected to the input and output sides of the amplifying medium and are capable of reflecting light with a predetermined optical wavelength different from a signal wavelength contained in the input light, the branch coupler being interposed between the input or output side of the amplifying medium and one of the reflecting member. The reflecting member connected to the input side of the amplifying medium has a reflectance higher than that of the reflecting member connected to the output side of the amplifying medium.

The optical amplifying apparatus according to the present invention includes at least two stages of optical amplifiers, each of which has an amplifying medium for amplifying input light through use of the excitation energy of pumping light and for outputting the amplified light. Further, the optical amplifying apparatus is capable of preventing propagation of optical surges to the optical amplifiers in the subsequent stages by suppressing optical surges that occur in the optical amplifier in the first stage, and is capable of propagating oscillated light output from the optical amplifier in the first stage to the optical amplifiers in the subsequent stages successively, and hence optical surges can be prevented from occurring in the optical amplifiers in the subsequent stages.

As a result, an increase in the gain of the amplifying medium due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

The present invention provides an optical transmitter for use in an optical communications system which outputs an optical signal amplified by an optical output amplifier. The output amplifier comprises: an amplifying medium for amplifying input light through use of the excitation energy of pumping light and for outputting the amplified light; a pumping light source for generating the pumping light; a pumping light incident coupler which introduces the pumping light emitted from the pumping light source into one end of the amplifying medium; a branch coupler for causing an optical signal received from the amplifying medium to branch which is disposed on the input side of the amplifying medium or to the output side; and reflecting members which are respectively connected to the input and output sides of the amplifying medium and are capable of reflecting light with a predetermined optical wavelength different from a signal wavelength contained in the input light, the branch coupler being interposed between one of the reflecting members and the input or output side of the amplifying medium.

According to the present invention, the optical transmitter for use with the optical communications system that outputs an optical signal amplified by an optical output amplifier is capable of preventing propagation of optical surges to the optical amplifiers in the subsequent stages by suppressing optical surges that occur in the optical output amplifier. Further, the amplifying apparatus is capable of propagating oscillated light output from the optical output amplifier to optical amplifiers in the subsequent stages successively, and hence optical surges can be prevented from occurring in the optical amplifiers in the subsequent stages.

As a result, an increase in the gain of the amplifying medium due to the reduction in the intensity of the input light is suppressed, and optical surges that develop when an abrupt increase occurs in the signal light can be effectively suppressed. Consequently, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

The present invention provides a method of suppressing occurrence of optical surges in an optical amplifier characterized by discharging excitation energy accumulated in an amplifying medium by oscillating light with a wavelength different from a signal light wavelength contained in input light if there is a reduction in the intensity of the input light, in order to suppress optical surges in an optical signal output from an optical amplifier having an amplifying medium which amplifies the input light containing the signal light and outputs the amplified light.

In this case, the degree of emission of excitation energy resulting from oscillation of the light may be controlled in such a way that the gain of the amplifying medium becomes lower than the level of occurrence of optical surges.

By the method of suppressing optical surges in an optical amplifier according to the present invention, excitation energy accumulated in an amplifying medium is discharged by oscillating light with a wavelength different from the signal light wavelength contained in input light if there is a reduction in the intensity of the input light, in order to suppress optical surges in an optical signal output from an optical amplifier having an amplifying medium which produces an amplified output from the input light containing the optical signal. As a result, the intensity of the optical signal is prevented from exceeding the tolerances of the optical components of the signal-light receiving section, thereby preventing overloads on the optical components. In turn, there is an advantage of improvement in the durability of the light-receiving components and the receiving circuit, as well as the realization of stable optical communication.

(b) Description of a First Embodiment

With reference to the accompanying drawings, a first embodiment of the present invention will be described hereinbelow.

Figure 3:
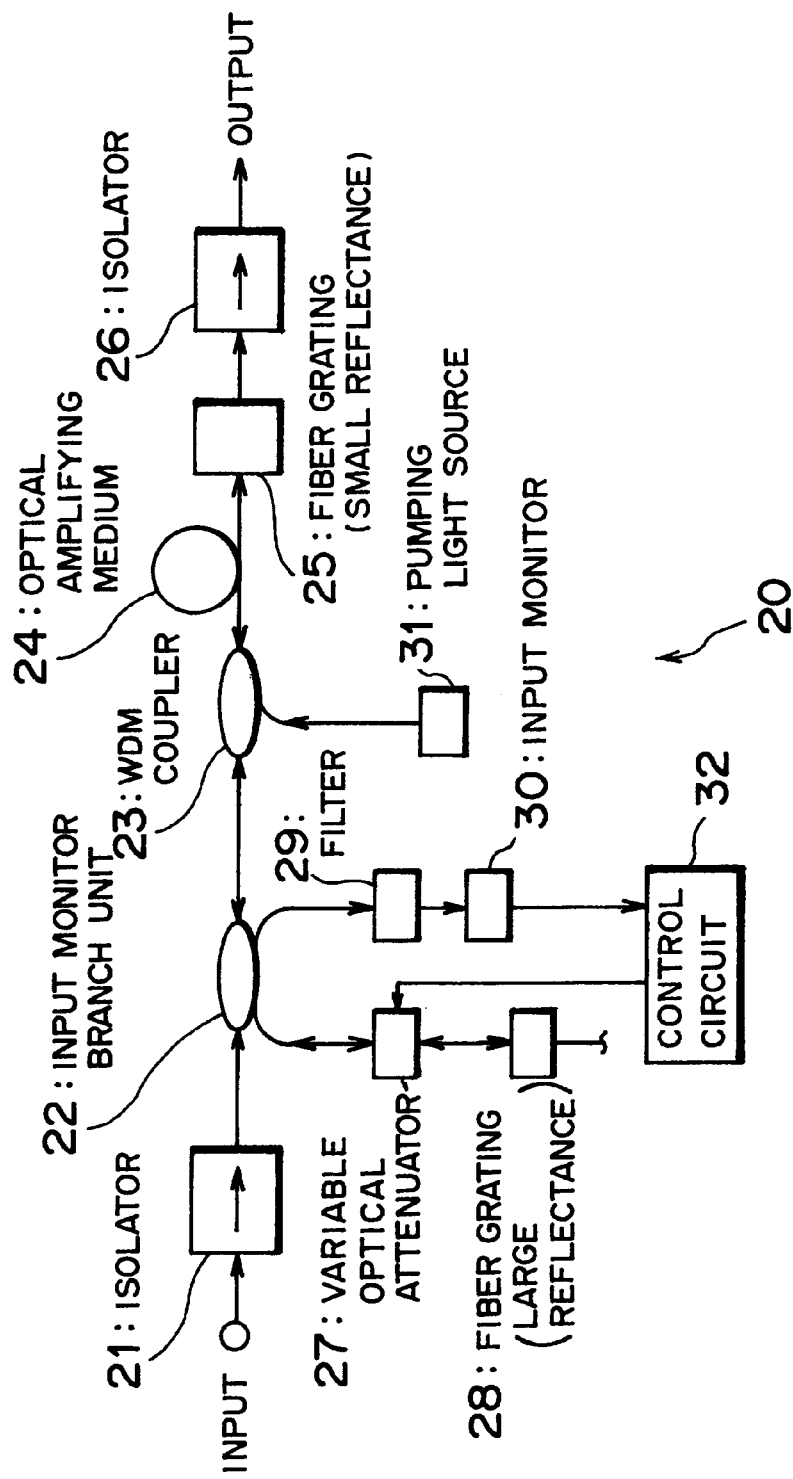
FIG. 3 is a block diagram illustrating the configuration of an optical amplifier according to a first embodiment of the present invention.

FIG. 3 is a block diagram illustrating the configuration of an optical amplifier according to the first embodiment of the present invention.

Figure 4:
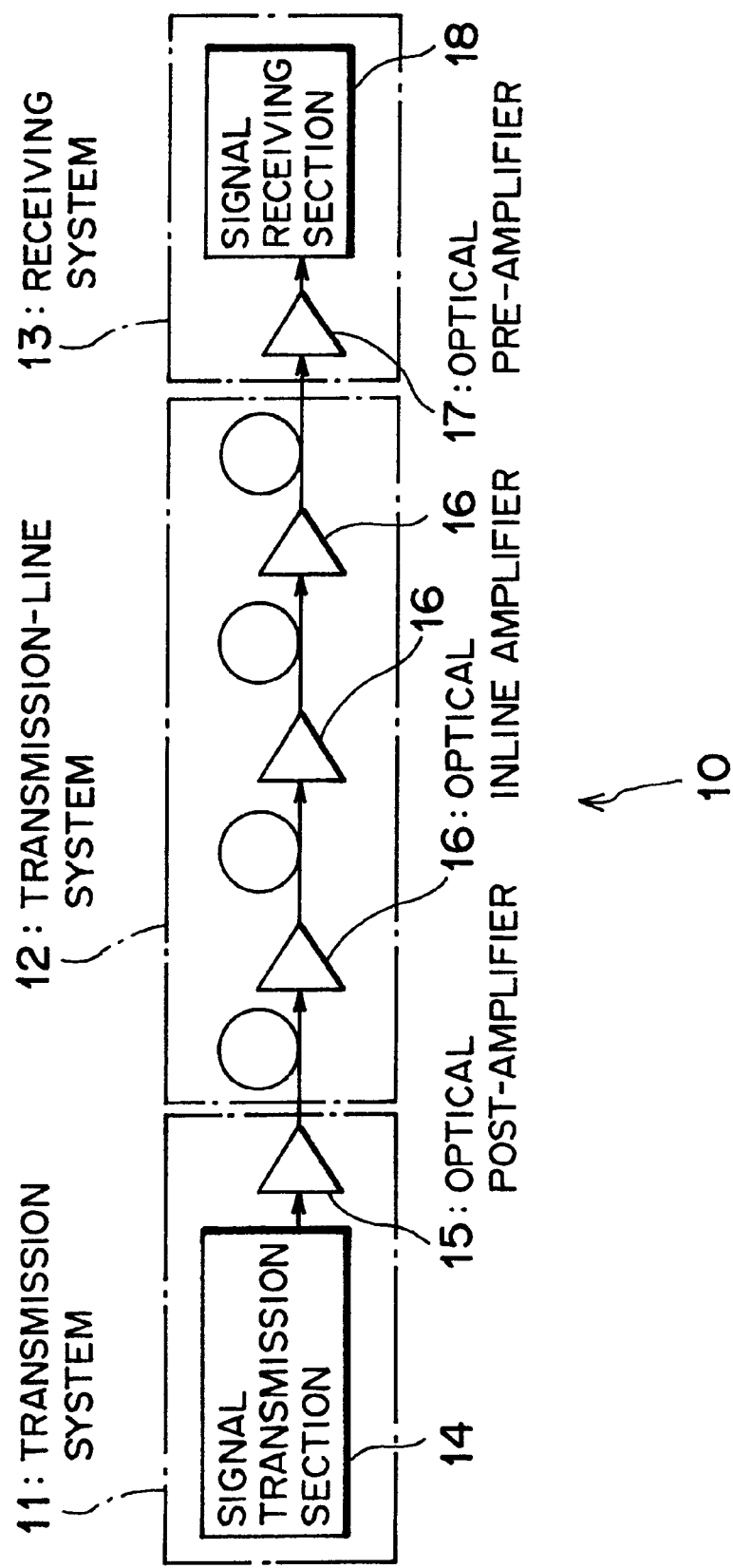
FIG. 4 is a block diagram illustrating the configuration of an optical communications system which employs the optical amplifier of the first embodiment of the present invention.

The optical amplifier shown in FIG. 3 is used as an optical amplifier for amplifying an optical signal in an optical communications system 10 shown in FIG. 4.

As illustrated in FIG. 4, the optical communications system 10 is comprised of a transmission system (an optical transmitter) 11 which consists of a signal transmission section 14 and an optical post-amplifier (an optical output amplifier) 15, a transmission-line system 12 including a plurality of optical inline amplifiers 16, and a receiving system (an optical receiver) 13 consisting of an optical preamplifier 17 and a signal receiving section 18.

The transmission system (the optical transmitter) 11 amplifies an optical signal through use of the optical post-amplifiers (the optical output amplifiers) 15 and transmits the amplified optical signal to the receiving system (the optical receiver) 13.

The transmission-line system 12 sends the optical signal received from the transmission system 11 to the receiving system 13 while amplifying and relaying the optical signal many times. The receiving system (the optical receiver) 13 receives the optical signal from the transmission system 11 via the transmission-line system 12.

The optical amplifier 20 shown in FIG. 3 can be used as the optical post-amplifier 15, the optical inline amplifier 16, and the optical preamplifier 17 shown in FIG. 4. In the first embodiment, an explanation is particularly given of a case where this optical amplifier 20 is used as the optical post-amplifier 15.

The optical amplifier 20 shown in FIG. 3 is an optical amplifier in which the power of pumping light is controlled to a given level. More specifically, the optical amplifier 20 is comprised of an optical amplifying medium 24, a pumping light source 31, a WDM (Wavelength Division Multiplexing) coupler 23, an input monitor branch unit 22 for use with an input monitor, fiber gratings 25 and 28, an input monitor 30, a variable optical attenuator 27, a control circuit 32, a filter 29, and isolators 21 and 26.

That is, the isolator 21, the input monitor branch unit 22, the WDM coupler 23, the optical amplifying medium 24, the fiber grating 25, and the isolator 26 are arranged in the optical amplifier 20, in this sequence from its input side.

The variable optical attenuator 27 and the fiber grating 28 are connected to one of two optical branch paths of the input monitor branch unit 22, and the filter 29 and the input monitor 30 are connected to the other optical branch path.

The pumping light source 31 is connected to the WDM coupler 23, and the control circuit 32 is connected to the input monitor 30 and the variable optical attenuator 27.

The optical amplifying medium 24 amplifies input light through use of excitation energy of the pumping light emitted from the pumping light source 31 and outputs the amplified light. The optical amplifying medium 24 is formed from rare-earth-element-doped fibers [particularly from erbium(Er)-doped fibers].

In addition to a signal light, which is the major signal component, the light input to the optical amplifier 20 includes light [e.g., light in the 1.53 µm band] whose wavelength differs from that of the signal light (in the 1.55 µm band).

Figure 10:
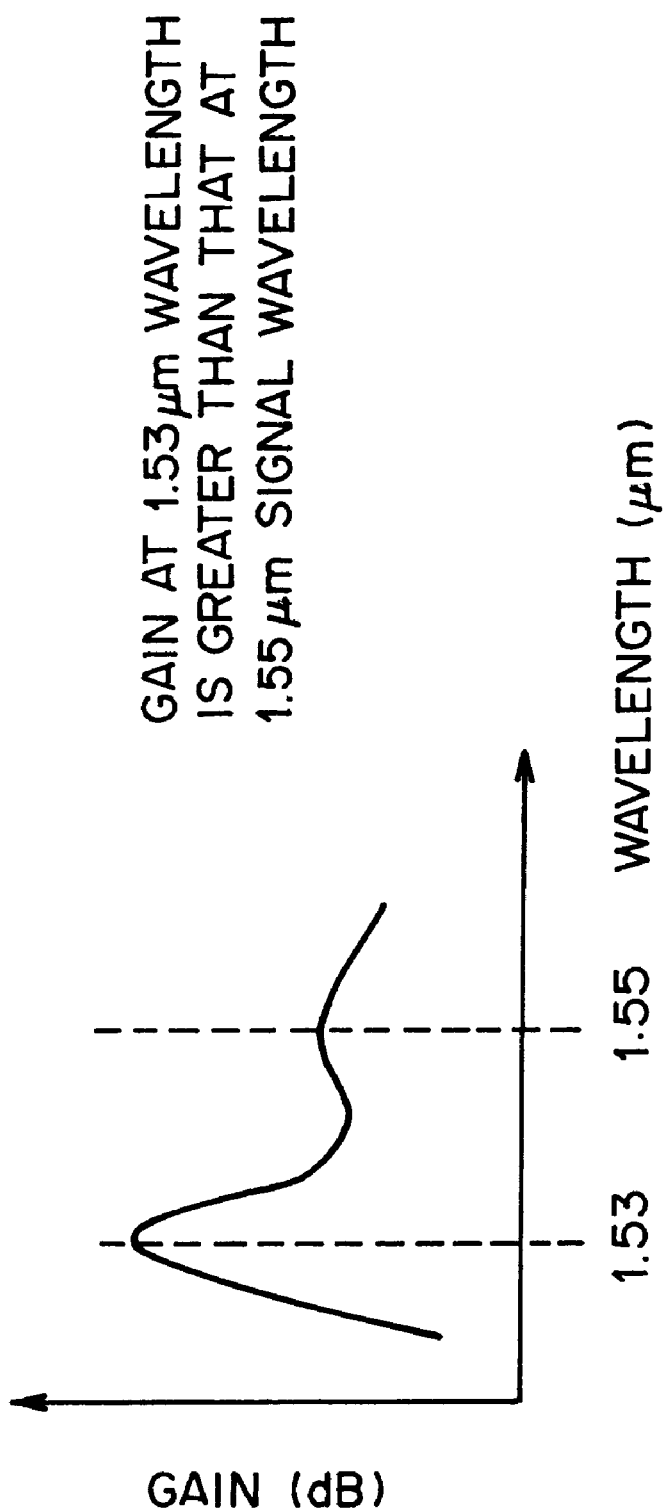
FIG. 10 is a graph illustrating the characteristics of an optical amplifying medium used in the optical amplifier of the first embodiment of the present invention.

FIG. 10 shows the general gain characteristics of the optical amplifying medium 24. As illustrated in FIG. 10, the optical amplifying medium 24 has characteristics such that the gain at the wavelength of light that can be reflected by the fiber gratings 25 and 28, which will be described later as the reflecting members, is higher than the gain at the wavelength of the signal light.

In the first embodiment, an explanation is given of a case where the wavelength of the signal light is in the 1.55 µm (1553 nm) band, and the wavelength of light that can be reflected by the fiber gratings 25 and 28 is in the 1.53 µm (1535 nm) band.

As illustrated in FIG. 3, the fiber grating 28 is disposed on the input side of the optical amplifying medium 24 via the WDM coupler 23, the input monitor branch unit 22, and the variable optical attenuator 27. As illustrated in FIG. 3, the fiber grating 25 is disposed on the output side of the optical amplifying medium 24.

The fiber gratings 25 and 28 are capable of reflecting light with a predetermined wavelength (oscillated light which will be described later in detail) different from the wavelength of the signal light contained in the input light and hence function as reflecting members.

The fiber gratings 25 and 28 possess sharp filtering characteristics and, as illustrated in FIG. 10, extract light with a wavelength (in the 1.53 µm band) at which the gain of the optical amplifying medium 24 becomes maximum when the level of the input light is low (e.g., when a small signal is input). The thus-extracted light is reflected by the fiber gratings 25 and 28.

More specifically, the fiber gratings 25 and 28 are optical devices having high reflective characteristics at a wavelength (in the 1.53 µm band) at which the gain of the optical amplifying medium 24 becomes higher than the gain of the same obtained at the wavelength of the signal light (in the 1.55 µm band) when there is an input of a small signal.

In the first embodiment, the reflectances of the fiber gratings 25 and 28 are determined in such a way that the aforementioned optical surges can be suppressed by virtue of the input-to-gain characteristics of the optical amplifying medium 24 (the adjustment of the gain of the optical amplifying medium 24 will be described later in detail).

Particularly, in the first embodiment, the reflectance of the fiber grating 28 connected to the input side of the optical amplifying medium 24 is set so as to be higher than that of the fiber grating 25 connected to the output side of the optical amplifying medium 24.

Figure 5:
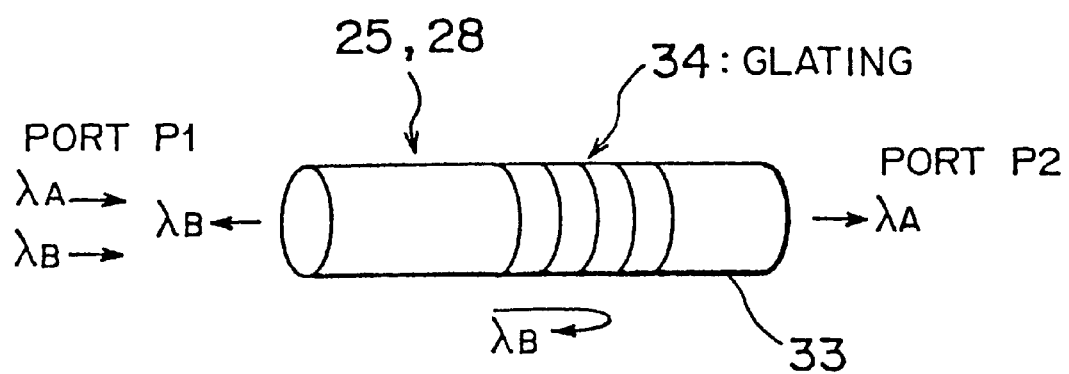
FIG. 5 is a schematic representation illustrating the configuration of a fiber grating used in the optical amplifier of the first embodiment of the present invention.

As illustrated in FIG. 5, each of the fiber gratings 25 and 28 has a structure such that gratings 34 are formed in a waveguide path 33 by exposure to UV radiation (i.e., UV trimming) so as to reflect an optical signal with a desired wavelength.

In a case where the gratings 34 having a Bragg wavelength $\lambda_B$ are formed in the fiber gratings 25 and 28, if optical signals $\lambda_A$ and $\lambda_B$ enter a port P1, the optical signal $\lambda_A$ is output to a port P2, and the optical signal $\lambda_B$ is reflected by the gratings 34 so as to emerge from the port P1.

More specifically, in the fiber gratings 25 and 28 of the first embodiment the gratings 34 having a Bragg wavelength of 1.53 µm band are formed. If signal light having a wavelength of 1.55 µm band and oscillated light having a wavelength of 1.53 µm band enter the port P1, the signal light whose wavelength is 1.55 µm band is output to the port P2, whereas the oscillated light whose wavelength is 1.53 µm band is output to the port P1 after having been reflected by the gratings 34.

Figure 7:
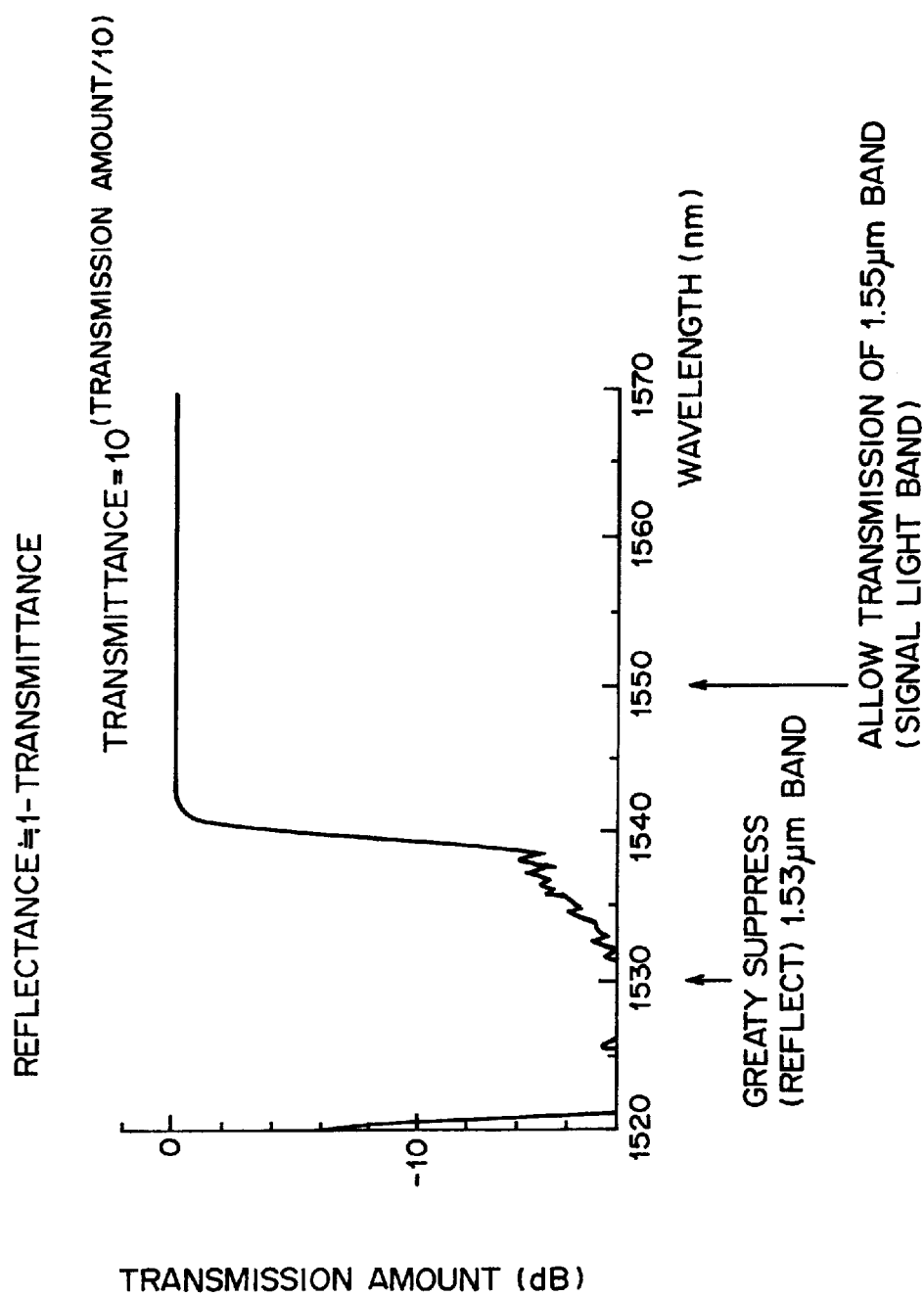
FIG. 7 is a graph illustrating the characteristics of the fiber grating used in the optical amplifier of the first embodiment of the present invention.

FIG. 6 illustrates one example of the reflective characteristics of the fiber gratings 25 and 28 applicable to the first embodiment. In this case, as illustrated in FIG. 7, the fiber gratings 25 and 28 reflect oscillated light in the 1.53 µm band.

The pumping light source 31 illustrated in FIG. 3 produces pumping light with a given intensity.

The WDM coupler 23 is a wavelength division multiplexing (WDM) separation coupler which carries out WDM separation. This WDM coupler 23 introduces the pumping light received from the pumping light source 31 into one end of the optical amplifying medium 24 and serves as a pumping light incident coupler.

As illustrated in FIG. 3, the input monitor branch unit 22 is connected to the input side of the optical amplifying medium 24 and bifurcates the signal light received from the isolator 21. The thus-bifurcated signal light is output to the input monitor 30 as an input monitor signal in the 1.55 µm band (or a first branch signal). Further, the input monitor branch unit 22 bifurcates light reflected from the fiber grating 25 in the subsequent stage via the optical amplifying medium 24. The thus-bifurcated light is output to the fiber grating 28 as oscillated light in the 1.53 µm band (or a second branch signal). In this way, the input monitor branch unit 22 serves as a branch coupler.

The input monitor branch unit 22 is a power branch coupler which bifurcates the power of the input light.

The input monitor 30 monitors the light output from the isolator 21 on the basis of the input monitor signal received from the input monitor branch unit 22 via the filter 29, and outputs to the control circuit 32 monitor information concerning the light input to the optical amplifying medium 24 (or input light monitor information).

In order to suppress optical surges by means of the input-to-gain characteristics of the optical amplifying medium 24 (the adjustment of gain of the optical amplifying medium 24 will be described later in detail), the variable optical attenuator 27 variably attenuates the intensity of light in the branch path of the input monitor branch unit 22 so that it reaches a predetermined level according to a reduction in the intensity of the input light. The attenuated optical signal is output to the fiber grating 28 on the side of the input monitor branch unit 22.

As previously described, the gain of the optical amplifying medium 24 is adjusted by setting the reflectances of the fiber gratings 25, 28 to arbitrary reflectances. If the fiber gratings 25 and 28 are provided for the optical amplifier 20, oscillated light may develop constantly regardless of the intensity of the input light.

For this reason, in the first embodiment, the optical amplifier 20 is provided with the variable optical attenuator 27 which variably attenuates the intensity of the oscillated light according to the reduction in the intensity of the input light in order to control the amount of reflection of the oscillated light from the fiber gratings 25 and 28, thereby controlling the gain of the optical amplifying medium 24.

In short, when the intensity of the input light is equal to or greater than a given value (when there is an input of signal light), the variable optical attenuator 27 controls the gain of the optical amplifying medium 24 so as to prevent generation of oscillated light in the optical amplifying medium 24. In contrast, when the intensity of the input light is lower than the given value (during the course of reduction of the intensity of the input light to a state in which there is no input of the signal light), the variable optical attenuator 27 controls the gain of the optical amplifying medium 24 so that oscillated light is generated in the light amplifying medium 24.

In the first embodiment, in order to efficiently reflect the oscillated light; namely, to increase the extent to which the threshold value of the gain of the optical amplifying medium 24 can be controlled when the oscillated light occurs, the variable optical attenuator 27 is disposed in front of the fiber grating 28 having a high reflectance.

Figure 8:
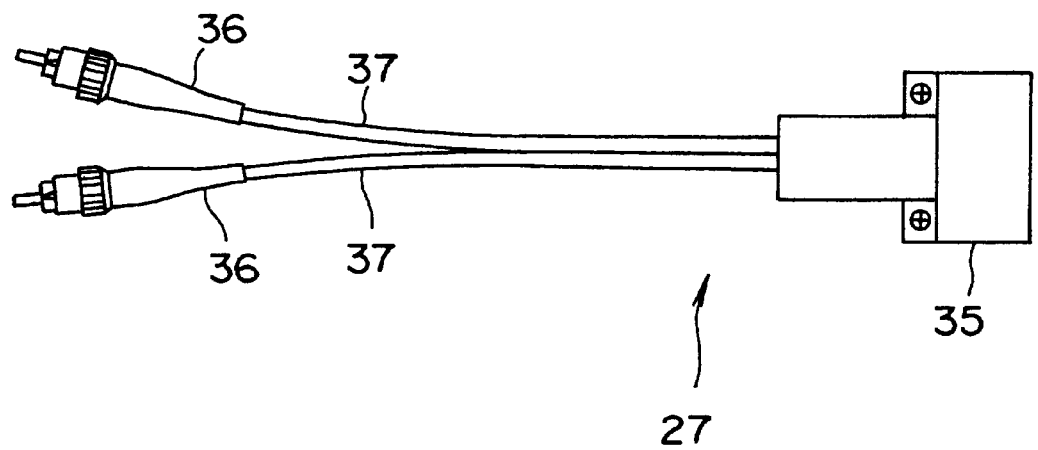
FIG. 8 is a schematic representation of a variable optical attenuator used in the optical amplifier of the first embodiment of the present invention.

As illustrated in FIG. 8, the variable optical attenuator 27 is a bidirectional variable optical attenuator and is comprised of a main body 35 of the variable optical attenuator and two connectors 36 connected to the main body 35 through respective cables 37.

The connectors 36 are connected to the input monitor branch unit 22 and to the fiber grating 28, respectively.

The variable optical attenuator 27 has, e.g., the characteristics as illustrated in FIG. 9.

The control circuit 32 operates as follows, on the basis of input light monitor information received from the input monitor 30. If the intensity of the input light decreases to a value lower than a preset threshold value; namely, if the intensity of the input light is low (or if there is an input of a small signal), the control circuit 32 controls the amount of attenuation of the oscillated light at the variable optical attenuator 27 in such a way that the gain at the signal light wavelength (in the 1.55 μm band) in the amplifying medium 24 decreases to a value lower than a predetermined value.

The function of the control circuit 32 is implemented via software processing through use of; e.g., a processor.

The filter 29 permits the passage of only light having the signal light wavelength (1.55 μm band) contained in the input monitor signal received from the input monitor branch unit 22 in order to prevent an input of a portion of the oscillated light into the input monitor 30, as well as outputting the thus-permitted light to the input monitor 30.

The isolators 21 and 26 permit the passage of light in only the direction indicated by the arrow in the drawing and are respectively attached to an input port for receiving input light and an output port for outputting an optical signal.

The above-mentioned oscillated light will be described. The oscillated light is light reflected from the fiber gratings 25 and 28 and has a predetermined wavelength (in the 1.53 μm band) different from the signal light wavelength (in the 1.55 μm band) contained in the input light.

Figure 11:
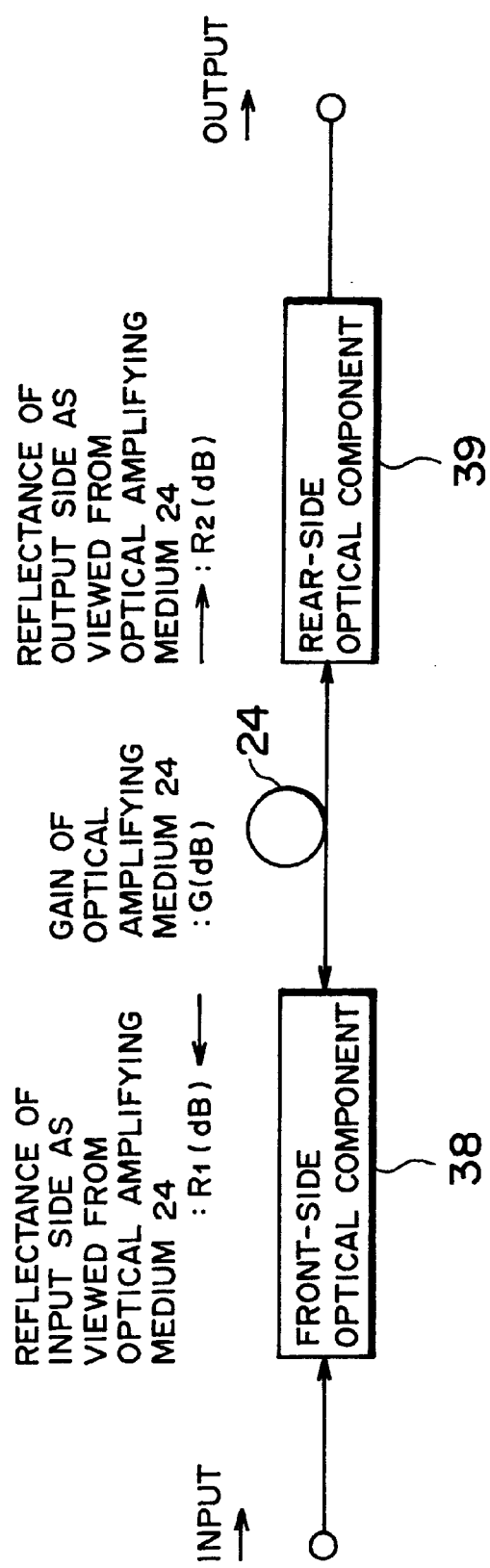
FIG. 11 is an illustrative representation for explaining oscillated light used in the optical amplifier of the first embodiment of the present invention.
Figure 12:
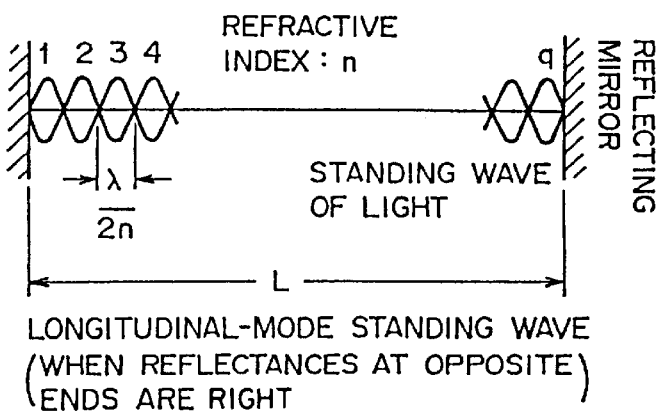
FIGS. 12(a) and 12(b) are illustrative representations for explaining the oscillated light used in the optical amplifier of the first embodiment of the present invention.
Figure 12:
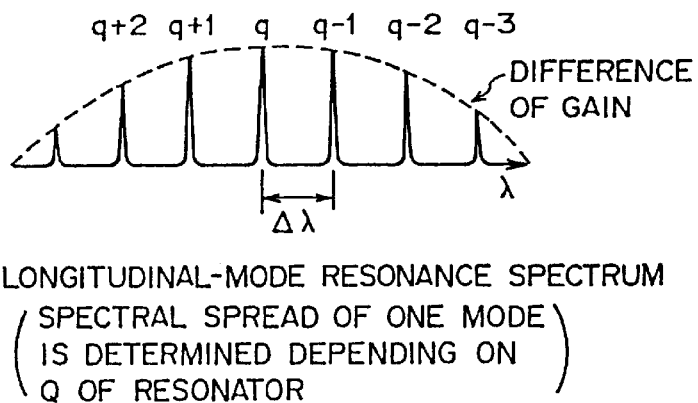

The light oscillates in a case where power conditions as illustrated in FIG. 11 and phase conditions as illustrated in FIGS. 12(a) and 12(b) are satisfied.

As illustrated in FIG. 11, provided that the gain of the optical amplifying medium 24 is G(dB), the reflectance of an optical component 38 disposed on the front side of the optical amplifying medium 24 is $R_1$ (dB), and the reflectance of an optical component 39 disposed on the rear side of the optical amplifying medium 24 is $R_2$ (dB), oscillation occurs when the following equation (1) is satisfied.

$$G(R_1 \cdot R_2)^{1/2}=1 \qquad (1)$$

It is obvious from Equation (1) that a higher gain (G) is more apt to cause oscillation.

The optical component 38 (illustrated in FIG. 11) disposed on the front side of the optical amplifying medium 24 represents the optical components provided on the front side of the optical amplifying medium 24 illustrated in FIG. 3 (i.e., the WDM coupler 23, the input monitor branch unit 22, etc.) in an integral form. The optical component 39 (illustrated in FIG. 11) disposed on the rear side of the optical amplifying medium 24 represents the optical components provided on the rear side of the optical amplifying medium 24 illustrated in FIG. 3 (i.e., the fiber grating 25 and the isolator 26) in an integral form.

FIGS. 12(a) and 12(b) are illustrative representations of a standing wave in a laser resonator.

In general, in a state in which laser oscillation is continued in the laser resonator, a standing wave of light having an equiphase wave surface parallel to the reflecting mirrors results from bouncing of the light back and forth within the laser resonator. This standing wave passes from the reflecting mirrors in the form of an output.

The standing wave has a profile as illustrated in FIGS. 12(a) and 12(b). Provided that the longitudinal length of the laser resonator is L, and the refractive index of a medium is "n," the entire length L is a product of an integral "q" and a half-wave length λ/(2n) within the medium. Therefore, we have $$[\lambda/(2n)] \times q = L \qquad (2)$$

Oscillation occurs when the phase conditions as shown in FIGS. 12(a) and 12(b) are satisfied.

Figure 13:
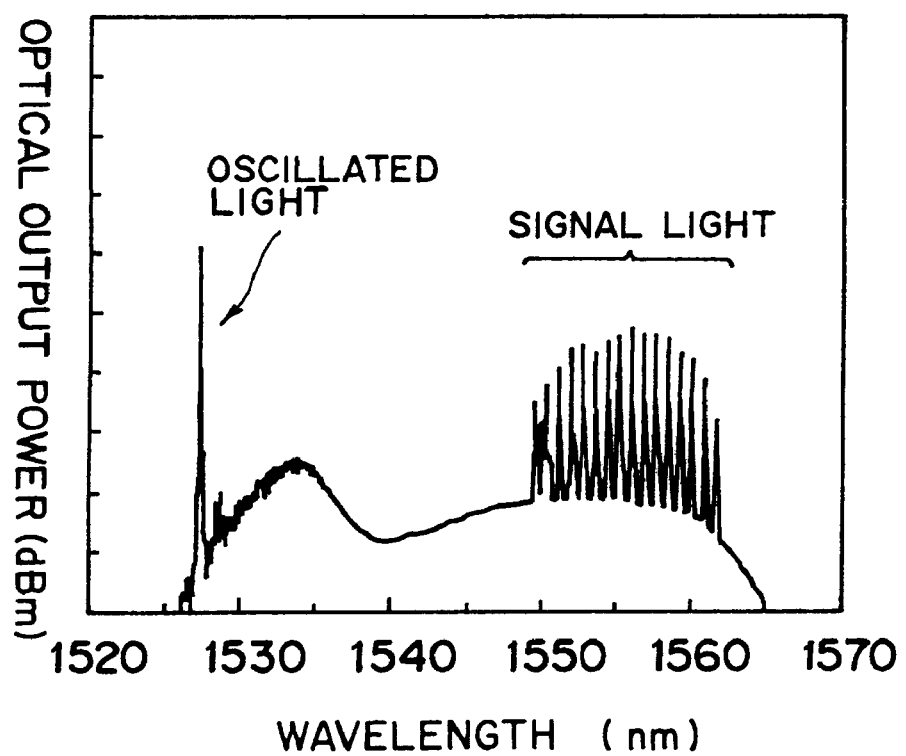
FIG. 13 is an illustrative plot for explaining the oscillated light used in the optical amplifier of the first embodiment of the present invention.
Figure 14:
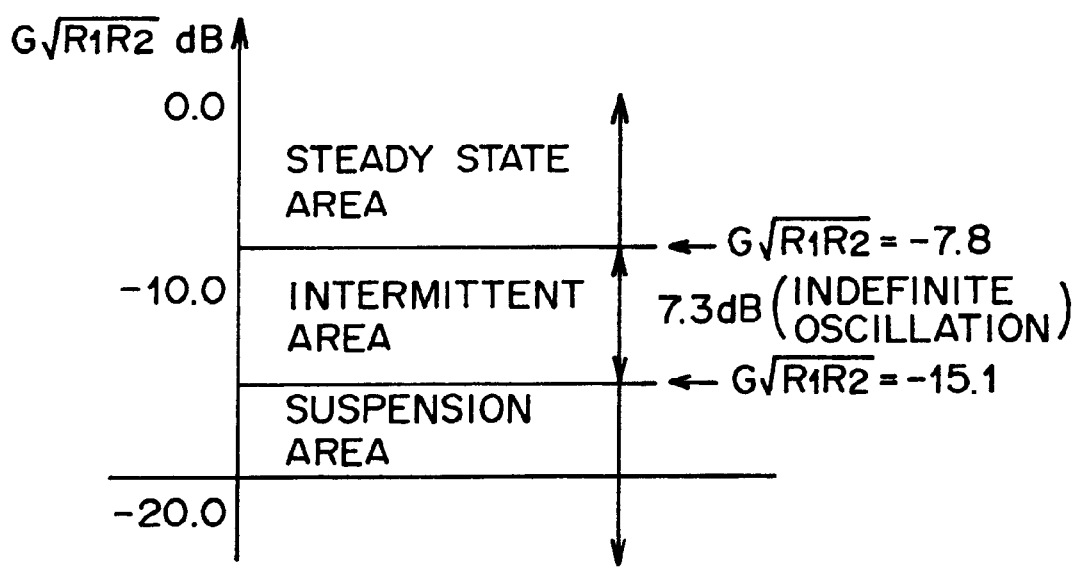
FIG. 14 is an illustrative representation for explaining the oscillated light used in the optical amplifier of the first embodiment of the present invention.

FIGS. 13 and 14 illustrate the results of the experimental oscillation performed by the optical amplifier illustrated in FIG. 3, to which a constant pumping power control method was applied, under the conditions as illustrated in FIGS. 11, 12(a), and 12(b).

To make oscillation easiest to occur, the experiment was carried out in a state in which no signal is input and reflecting members which do not have any particular wavelength dependence were used. The wavelength of the pumping light emitted from the pumping light source (i.e., the pumping wavelength) was set to 1.48 μm.

FIG. 13 illustrates the experimental result from which it was confirmed that oscillation occurs in the 1.53 μm band (see FIG. 10) at which there is a large amount of recovery of the gain associated with a reduction in the intensity of the signal input to the optical amplifying medium.

As previously described with reference to Equation (1), the reason for this is that a higher gain becomes more apt to cause oscillation.

As illustrated in FIG. 14, a gain width (see an "intermittent area" in FIG. 14) in which oscillation occurs indefinitely (or oscillation occurs intermittently) is present between a gain level at which oscillation steadily occurs (see a "steady oscillation area" in FIG. 14) and a gain level at which oscillation does not occur (see a "suspension area" in FIG. 14). The boundary area between the level at which oscillation is ensured and the level at which oscillation does not occur was found to be 7.3 dB or thereabouts as a result of the experiment. The gain width in which oscillation occurs indefinitely will be hereinafter referred to as an oscillation on/off margin width.

It is generally known that a physically-determined oscillation on/off margin width (or a theoretical oscillation on/off margin width) is about 1.3 dB in the case of a loss difference between a dominant mode and a sub-mode required for single mode operation at the direct modulation of a semiconductor laser.

It is considered that the existence of the oscillation on/off margin width is due to a polarization dependence in the gain of the optical amplifying medium and the reflectance of the reflecting members of the actual optical amplifier.

Particularly, it is considered that the use of an optical device having a reflectance as low as −50 dB or thereabouts as the reflecting member in the experiment might have resulted in higher influence of the polarization dependence. As a result, the oscillation on/off margin width might have become wider than the physically-determined on/off margin width.

To prevent such a problem, the optical amplifier 20 of the first embodiment uses the fiber gratings 25 and 28 having high reflectances as the reflecting members. As a result of provision of the fiber gratings 25 and 28 before and after the optical amplifying medium 24, the polarization dependence in the reflectance of the reflecting members is reduced, thereby decreasing the oscillation on/off margin width (in such a way that it becomes close to a theoretical value of 1.3 dB).

Figure 15:
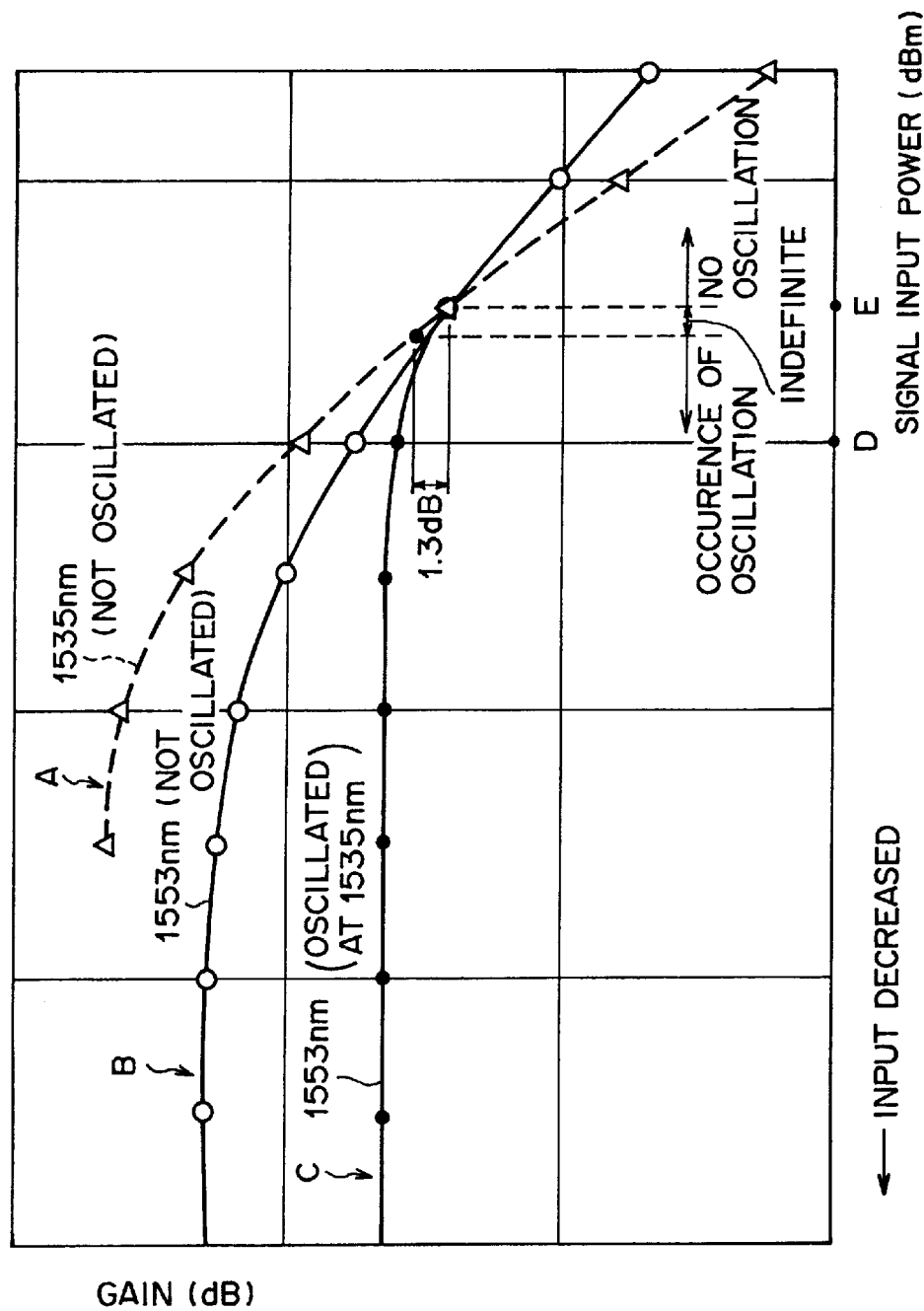
FIG. 15 is an illustrative plot showing the characteristics of the optical amplifying medium used in the optical amplifier of the first embodiment of the present invention.

The previous gain adjustment of the optical amplifying medium 24 will be described in reference to FIG. 15. FIG. 15 is a plot illustrating the gain characteristics of the optical amplifying medium 24 when there is an input of a small signal.

In FIG. 15, curves A and B show the gain characteristics of light at respective wavelengths of 1535 nm and 1553 nm in a case where the fiber gratings 25 and 28 having high reflectances are not disposed in a signal transmission path on the input and output sides of the optical amplifying medium 24 (or in a case where oscillation does not occur).

Curve C depicts the gain characteristics of light (signal light) with a wavelength of 1553 nm in a case where the fiber gratings 25 and 28 having high reflectances are disposed in the signal transmission path on the input and output sides of the optical amplifying medium 24 (or in a case where oscillation occurs at a wavelength of 1535 nm).

The gain of the optical amplifying medium 24 is returned from the saturated level as an input decreases. Hence, as shown by curves A and B in FIG. 15, the gain of the optical amplifying medium 24 increases with a reduction in the intensity of the input signal.

However, in the case where oscillation occurs upon reduction in the intensity of the input signal, the gain of the optical amplifying medium 24 is fixed to a given level, as shown by curve C in FIG. 15, when oscillation occurs (the thus-fixed gain will be hereinafter referred to as "a threshold gain of the optical amplifying medium 24").

As previously described with reference to FIG. 10, this is due to the characteristics of the optical amplifying element 24 in which the gain at the wavelength of light (in the 1.53 μm band) that is reflected by the fiber gratings 25 and 28 higher than the gain at the wavelength of the signal light (in the 1.55 μm band), as illustrated by curves A and B in FIG. 15, when there is an input of a small signal (i.e., when the level of the input signal light is low).

Optical surges occur because of an increase in the gain of the optical amplifying medium 24 caused by a reduction in the intensity of the input signal. Consequently, the optical-surge-suppression effect of the optical amplifier 20 of the first embodiment can be ascertained by comparison of B to C illustrated in FIG. 15.

As described above, the optical amplifier 20 of the first embodiment actively causes oscillation in the 1.53 μm band at which oscillation is apt to occur, through use of the fiber gratings 25 and 28 when there is an input of a small signal. An increase in the gain of the optical amplifying medium 24 caused by the reduction in the intensity of the input signal is suppressed by adjusting the threshold gain of the optical amplifying medium 24 at which oscillated light occurs, through use of the variable optical attenuator 27. As a result, the gain of the optical amplifying medium 24 is fixed to a value, enabling suppression of optical surges (see curve C in FIG. 15).

The points of design of the optical amplifier 20 of the first embodiment will be described on the basis of the experimental results on the gain characteristics of the optical amplifying medium 24 illustrated in FIG. 15.

The points of design of the optical amplifier 20 of the first embodiment are shown by (1) to (4) below.

(1) The threshold gain of the optical amplifying medium 24 at which oscillation occurs is higher than the gain required for the optical amplifying medium 24.

(2) The gain of the optical amplifying medium 24 and the reflectances of the optical components (see reference numerals 38 and 39 in FIG. 11) disposed before and after the optical amplifying medium 24 are set appropriately.

The reflectances are set so as to ensure prevention of oscillation when the intensity of the input light is high (or is in an input area higher than E in FIG. 15). In other words, the reflectances must be set such that $G(R_1 \cdot R_2)^{1/2}$ of Equation (1) is in the oscillation suspension area illustrated in FIG. 14.

Further, when the intensity of the input light decreases (or the intensity of the input light is in an input area lower than D in FIG. 15), the reflectances are set so as to ensure occurrence of oscillation. In other words, the reflectances must be set in such a way that $G(R_1 \cdot R_2)^{1/2}$ is in the steady oscillation area illustrated in FIG. 14.

(3) The optical amplifier 20 is designed so as to make the oscillation on/off margin width (the intermittent area illustrated in FIG. 14) close to the minimum value (or a theoretical value of 1.3 dB).

More specifically, it is necessary to design the optical amplifier 20 such that its polarization dependence is minimized by selection of optical components having a low polarization dependence (PDL). Further, it is necessary to reduce an influence on fluctuations of polarization by securely fixing the constituent optical components of the optical amplifier 20 so as not to undergo external variations.

As previously described, in order to reduce the polarization dependence, it is important to use an optical device having a high reflectance. For this reason, the fiber gratings 25 and 28 are used in the first embodiment as the optical devices having high reflectances.

(4) The optical amplifying medium 24 having a large gain is selected in order to ensure occurrence of oscillation by extending the wavelength band which satisfies the phase conditions for oscillation.

With the previous points of design, as indicated by C in FIG. 15, the optical amplifier 20 of the first embodiment amplifies an optical signal while suppressing optical surges by preventing the cause of optical surges; i.e., an increase in the gain of the optical amplifying medium 24 due to the reduction in the input light, even when there is an input of light with a sharp rising edge after completion of the reduction in the intensity of the input light.

First, in the optical amplifier 20 illustrated in FIG. 3, the wavelength (in the 1.53 μm band) at which the gain of the optical amplifying medium 24 becomes higher than the signal light wavelength obtained when there is an input of a small signal, is set as the wavelength of the oscillated light.

When the optical signal enters the optical amplifier 20, input light is input to the optical amplifying medium 24 via the isolator 21, the input monitor branch unit 22, and the WDM coupler 23.

The optical amplifying medium 24 amplifies the input light and outputs the thus-amplified light to the fiber grating 25.

The fiber grating 25 outputs light with a signal light wavelength (in the 1.55 μm band) of the input light to the isolator 26. Of the input light, the light (oscillated light) with the oscillated light wavelength (in the 1.53 μm band) is reflected by the fiber grating 25, and the thus-reflected light re-enters the optical amplifying medium 24.

The optical amplifying medium 24 outputs the oscillated light to the variable optical attenuator 27 via the WDM coupler 23 and the input monitor branch unit 22.

In contrast, a portion of the light input to the optical amplifier 20 is bifurcated by the input monitor branch unit 22, and the thus-bifurcated light is input to the input monitor 30 in the form of the input monitor signal via the filter 29.

On the basis of the input monitor signal, the input monitor 30 monitors the light input from the input port to the optical amplifying medium 24. The result of the monitor is output to the control circuit 32 as monitor information of the input light.

For example, if it is determined on the basis of input light monitor information received from the input monitor 30, that the intensity of the input light decreases to a value lower than a preset threshold value, the control circuit 32 controls the amount of attenuation of the oscillated light at the variable optical attenuator 27, in such a way that the gain of the signal light wavelength (in the 1.55 X m band) in the amplifying medium 24 decreases to a value lower than a predetermined value.

As described above, the oscillated light whose intensity has been controlled by the variable optical attenuator 27 is output to the fiber grating 28 disposed in the vicinity of the input monitor branch unit 22.

The fiber grating 28 reflects the light with a predetermined wavelength (i.e., light in the 1.53 μm band) different from the signal light wavelength, and the thus-reflected light re-enters the variable optical attenuator 27.

In this way, if there is a reduction in the intensity of the input light, oscillation occurs between the fiber gratings 28 and 25, thereby controlling the threshold gain of the optical amplifying medium 24 in the optical amplifier 20.

That is, the optical amplifying medium 24 discharges excitation energy excessively accumulated when there is an input of a small signal or no signal by emitting oscillated light before the gain of the optical amplifying medium 24 increases as a result of mitigation of gain saturation of the optical amplifying medium 24.

The degree of discharge of excitation energy caused by oscillation is controlled by regulation of the reflectances of the fiber gratings 25 and 28 and of the amount of attenuation of light at the variable optical attenuator 27, in such a way that the gain of the optical amplifying medium 24 becomes lower than an allowable level for optical surge (i.e., a level at which the amount of possible optical surges becomes lower than a predetermined value).

Therefore, the gain of the optical amplifying medium 24 is fixed to the threshold gain, thereby suppressing the increase in the gain of the optical amplifying medium 24 at the signal light wavelength (in the 1.55 μm band) associated with the reduction in the input signal. As a result, the optical signal can be amplified while optical surges are suppressed.

In short, the optical signal can be amplified while optical surges are suppressed by intentionally generating oscillated light, and discharging the energy of pumping light excessively accumulated when there is a reduction in the intensity of the input signal.

The optical-surge-suppression effect of the optical amplifier 20 of the first embodiment will be described by comparing with each other optical surges that occur in the following cases (1) to (4).

Figure 16:
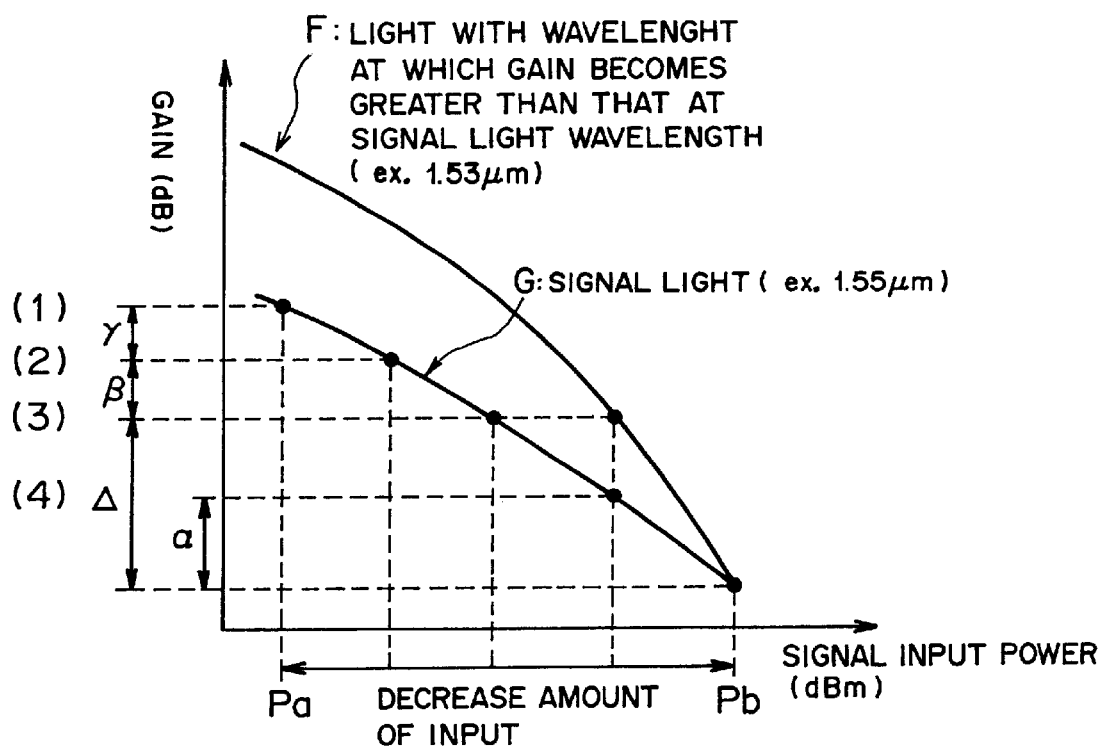
FIG. 16 is an illustrative plot for explaining an effect of suppressing optical surges in the optical amplifier of the first embodiment of the present invention.

FIG. 16 is a graph illustrating the gain characteristics of the optical amplifying medium 24. The horizontal axis represents a signal input (dBm), and the longitudinal axis represents the gain (dB) of the optical amplifying medium 24. In FIG. 16, G designates the gain (dB) at the signal light wavelength of 1.55 μm, and F designates the gain at a wavelength (e.g., 1.53 μm) at which light is amplified with a larger gain.

FIG. 17 is a table illustrating the effect of reducing optical surges on the basis of the gain characteristics illustrated in FIG. 16.

(1) Where oscillation does not occur even when there is a reduction in the input light This is the case of an ordinary optical amplifier in which optical surges are not suppressed.

Figure 18:
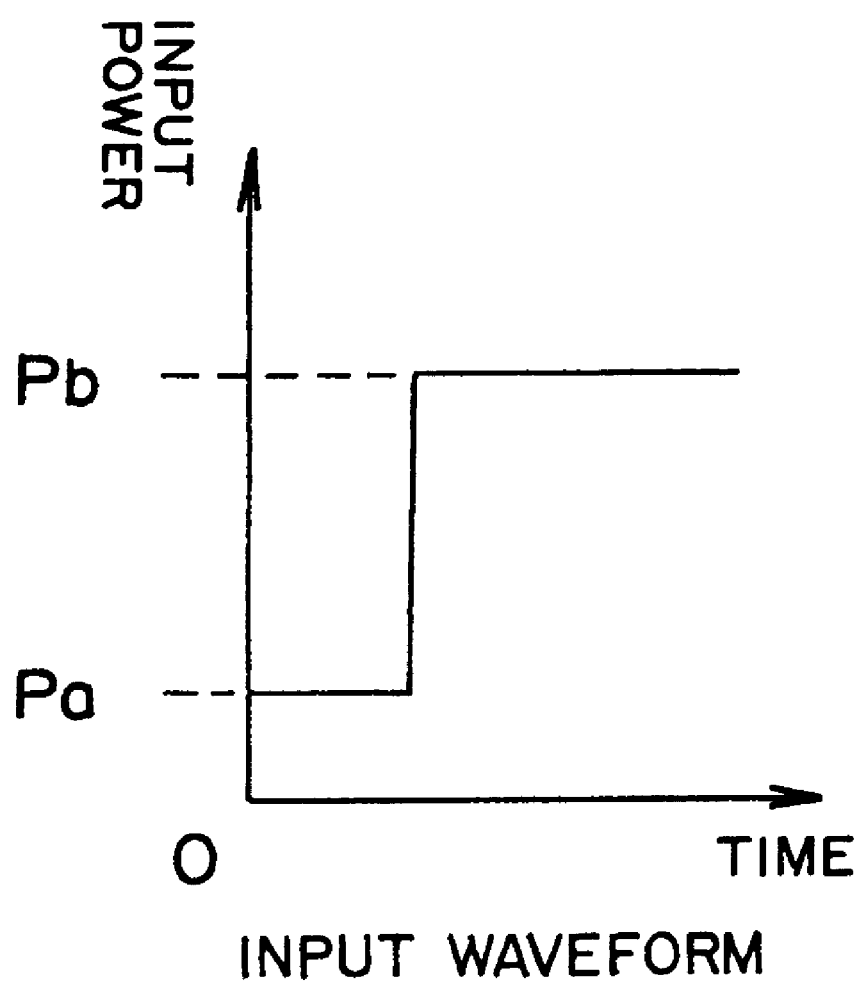
FIG. 18 is an illustrative plot for explaining the effect of suppressing optical surges in the optical amplifier of the first embodiment of the present invention.
Figure 19:
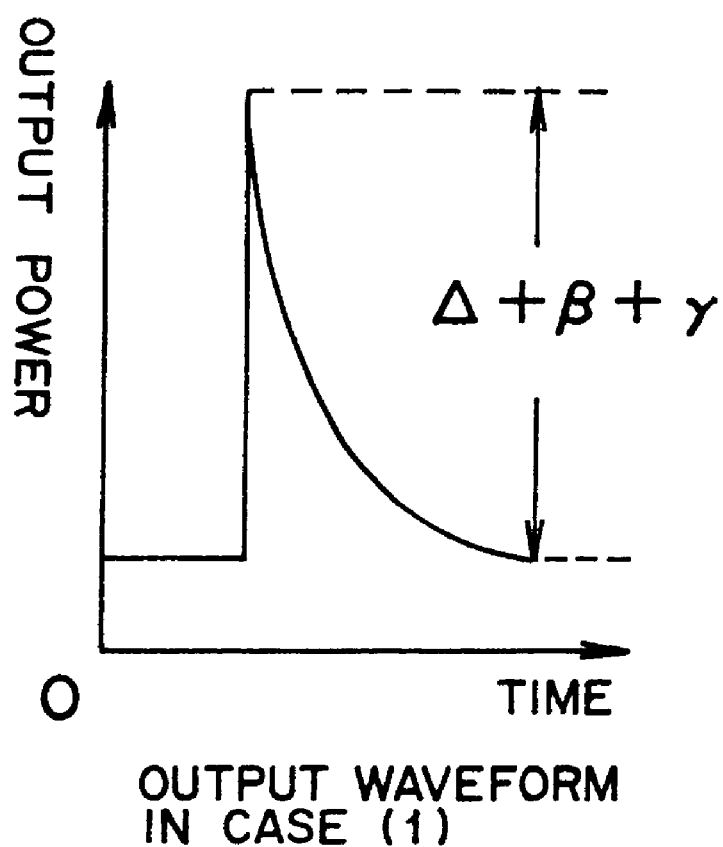
FIG. 19 is an illustrative plot for explaining the effect of suppressing optical surges in the optical amplifier of the first embodiment of the present invention.

FIG. 19 designates an output waveform of signal light when the signal light having a waveform as illustrated in FIG. 18 is input to the optical amplifier.

At this time, since the amount of increase in the gain of the optical amplifying medium associated with a reduction in the input of the optical signal is maximum, the amount of resultant optical surges (Δ+β+γ) is maximum, as illustrated in FIGS. 16, 17, and 19.

(2) Where oscillation occurs associated with a reduction in the intensity of the input signal This case corresponds to the case where oscillation occurs during the course of reduction of the optical signal input under the same conditions as those in the case (1). In this case, the increase in the gain of the optical amplifying medium is suppressed when oscillation occurs. Therefore, a reduction in the optical surges can be checked when the amount of increase (Δ+β) in the gain of the optical amplifying medium associated with a reduction in the input signal is compared with that in the case (1).

(3) Where the gain of the optical amplifying medium is decreased at the signal light wavelength From Equation (1) $[G (R_1 \cdot R_2)^{1/2}=1]$, the threshold gain G of the optical amplifying medium decreases as the reflectances $R_1$, $R_2$ of the optical components in the optical amplifying medium are increased.

More specifically, the case (3) relates to a case where the reflectances $R_1$, $R_2$ of the optical components in the optical amplifier at the signal light wavelength (in the 1.55 μm band) are increased. In this case, when compared with the degree of oscillation in the case (2), the degree of oscillation becomes large as a result of an increase in the reflectances. It is seen that the effect of reducing optical surges has been improved when the amount of increase (Δ) in the gain of the optical amplifying medium associated with a reduction in the input of the optical signal is compared with that in the case (2).

However, as can be seen from FIG. 14, there is an oscillation on/off margin width for occurrence of oscillation, it is impossible to reduce the resultant optical surges to the amount of oscillation on/off margin Δ (7.5 dB according to the experimental result illustrated in FIG. 14) which is the minimum increase in the gain of the optical amplifying medium 24 associated with the reduction in the input of the optical signal.

(4) Where the gain of the optical amplifying medium is reduced at a wavelength at which there is a large amount of increase in the gain associated with the reduction in the input of the optical signal This case is one in which the threshold gain of the optical amplifying medium 24 is reduced by increasing the reflectances $R_1$, $R_2$ of the optical components in the optical amplifying medium 20 at the wavelength (in the 1.53 μm band) at which the gain of the optical amplifying medium 24 increases to become higher than the gain at the signal light wavelength (in the 1.55 μm band), similar to the optical amplifier 20 of the first embodiment.

Figure 20:
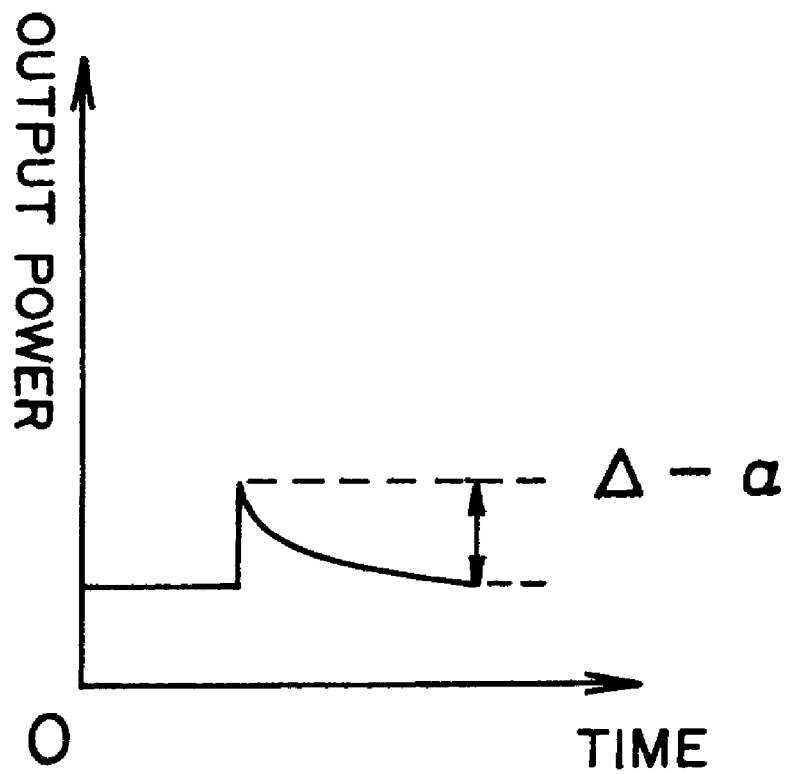
FIG. 20 is an illustrative plot for explaining the effect of suppressing optical surges in the optical amplifier of the first embodiment of the present invention.

FIG. 20 shows an output waveform of the optical signal obtained when the optical signal having a waveform as illustrated in FIG. 18 is input to the optical amplifier 20.

In this case, when compared to the degree of oscillation in the case (3), the oscillation level becomes higher as a result of an increase in the reflectances of the optical components at the wavelength at which the optical amplifying medium 24 has a large gain (or at the wavelength at which oscillation is apt to occur). As compared to the reduction in the amount of increase in the gain of the optical amplifying medium 24 associated with a reduction in the input of the optical signal in the case (3), it can be reduced by α so that the amount of increase becomes Δ−α (see FIGS. 16, 17, and 20).

Particularly, in the first embodiment, the fiber gratings 25 and 28 are used as optical devices capable of extracting light with a wavelength at which the gain of the optical amplifying medium 24 is maximized when there is an input of a small signal (i.e., the oscillated light in the 1.53 μm band) by utilizing the sharp filtering characteristics. As a result, the reflection characteristics of the optical amplifying medium 24 are improved, thereby producing a higher effect.

An explanation will be given of the effect of suppressing optical surges in a case where the optical amplifier 20 of the first embodiment is used as the optical post-amplifier 15 of the optical communications system 10 illustrated in FIG. 4.

The optical post-amplifier 15 causes optical surges first and foremost under the influence of variations in the signal waveform and signal level. For this reason, in the first embodiment, propagation of optical surges to the optical amplifiers (e.g., the optical inline amplifier 16 and the optical preamplifier 17 illustrated in FIG. 4) disposed after the optical post-amplifier 15 by suppressing the optical surges developing in the optical post-amplifier 15.

Further, in the first embodiment, the fiber grating 28 having a high reflectance is disposed on the input side of the optical amplifying medium 24 in the optical post-amplifier 15 (the optical amplifier 20), and the fiber grating 25 having a low reflectance is disposed on the output side of the optical amplifying medium 24. The oscillated light output from the optical post-amplifier 15 can propagate through the optical amplifiers disposed after the optical post-amplifier 15 one after another. As a result, it is also possible to suppress optical surges in the optical amplifiers disposed after the optical post-amplifier 15 and do not have any capability of preventing optical surges.

The optical post-amplifier 15 has an operation point in an area where the optical amplifying medium 24 has a large degree of gain saturation (or in an area where there is a large input) as compared to the optical inline amplifier 16 and the optical preamplifier 17. For this reason, the amount of increase in the gain of the optical amplifying medium 24 associated with the amount of reduction in the input of the optical signal is large, thereby providing a large effect of suppressing optical surges.

In this way, according to the optical amplifier 20 of the first embodiment, the fiber gratings 25 and 28 are provided on the input and output sides of the optical amplifying medium 24, respectively. Further, the optical amplifier 20 is provided with the input monitor 30, the variable optical attenuator 27, and the control circuit 32. The light input to the optical amplifying medium 24 from the input port is monitored by the input monitor 30. On the basis of monitoring results, the control circuit 32 controls the amount of attenuation of oscillated light at the variable optical attenuator 27. If there is a reduction in the intensity of the input light, the gain saturation of the optical amplifier 24 is mitigated so that the oscillated light can be output before the gain is increased. Therefore, an increase in the gain of the optical amplifying medium 24 associated with a reduction in the input at the signal light wavelength can be suppressed.

As a result, it is possible to effectively suppress optical surges that occur when light having an abrupt rising edge is input to the optical amplifying medium 24.

More specifically, where there is a reduction in the intensity of the input light, the optical amplifier 20 of the first embodiment is capable of discharging the excitation energy accumulated in the optical amplifying medium 24 by oscillating light having a wavelength different from the signal light wavelength contained in the input light through use of the fiber gratings 25 and 28. Consequently, optical surges in the optical signal output from the optical amplifier 20 can be effectively suppressed.

The optical amplifier 20 of the first embodiment can effectively suppress optical surges resulting from an abrupt increase in the signal light. The intensity of the signal light is prevented from imposing an excessive load on the optical components of the receiving section that receive the optical signal, to such an extent that the load exceeds the tolerances of the optical components. In turn, the durability of the receiving optical components and a receiving circuit is improved, enabling realization of stable optical communication.

At this time, it is possible for the variable optical attenuator 27 and the fiber grating 28 having a high reflectance to regulate the threshold gain of the optical amplifier 24 at a wavelength at which oscillation occurs. Accordingly, loss of the signal light due to interposition of the input monitor branch unit 22 can be avoided.

The reflectance of the fiber grating 28 disposed on the input side of the optical amplifying medium 24 is set so as to become higher than that of the fiber grating 25 disposed on the output side of the optical amplifying medium 24. This makes it possible to cause the oscillated light bouncing back and forth within the optical amplifier 20 to emerge and propagate through the optical amplifiers disposed after the optical amplifier 20, which also makes it possible to suppress optical surges of the optical amplifier disposed on the subsequent stage.

The variable optical attenuator 27 and the fiber grating 28 are connected to the optical branch path opposite to the existing optical branch path of the input monitor branch unit 22 to which the input monitor 30, etc., is connected. This eliminates the need of a new branch unit, thereby enabling simplification of the optical amplifier 20.

Further, the filter 29 is provided for permitting passage to the input monitor 30 of only the signal light wavelength contained in the input monitor signal received from the input monitor branch unit 22. The oscillated light output from the input monitor branch unit 22 is prevented from partly entering the input monitor 30, thereby enabling prevention of deterioration of the accuracy of the input monitor 30.

The isolator 21 provided in the front stage of the input monitor branch unit 22 can prevent the light which is power-branched by the input monitor branch unit 22 from outputting from the optical amplifier 20 via the input port. Further, the isolator 26 connected to the output port can prevent reentry of the light output from the optical amplifier 20 via the output port.

In a case where the optical amplifier 20 of the first embodiment is used as the optical post-amplifier 15 of the optical communications system 10 illustrated in FIG. 4, optical surges that develop in the optical post-amplifier 15 can be suppressed. This allows prevention of propagation of optical surges one after another to the optical amplifiers (e.g., the optical inline amplifier 16 and the optical pre-amplifier 17 illustrated in FIG. 4) on subsequent stages. Further, the oscillated light output from the optical post-amplifier 15 is propagated to the optical amplifiers disposed on subsequent stages one after another, thereby enabling suppression of optical surges in the optical amplifiers on the subsequent stages.

As a result, the intensity of the optical signal is prevented from imposing an excessive load on the optical components of the light receiving section which receive the optical signal, to such an extent that the load exceeds the tolerances of the optical components. This in turn results in improved durability of the optical receiving components and the receiving circuit, which in turn makes it possible to realize stable optical communication.

Band-pass filters may be used in lieu of the fiber gratings 25 and 28, which also provides the similar effects.

So long as a filter for permitting passage of only an optical signal by shutting off passage of the oscillated light is provided in the output signal transmission path of the fiber grating 25, the oscillated light produced in order to prevent optical surges can be prevented from emerging from the optical amplifier 20.

(c) Description of a Second Embodiment

Figure 21:
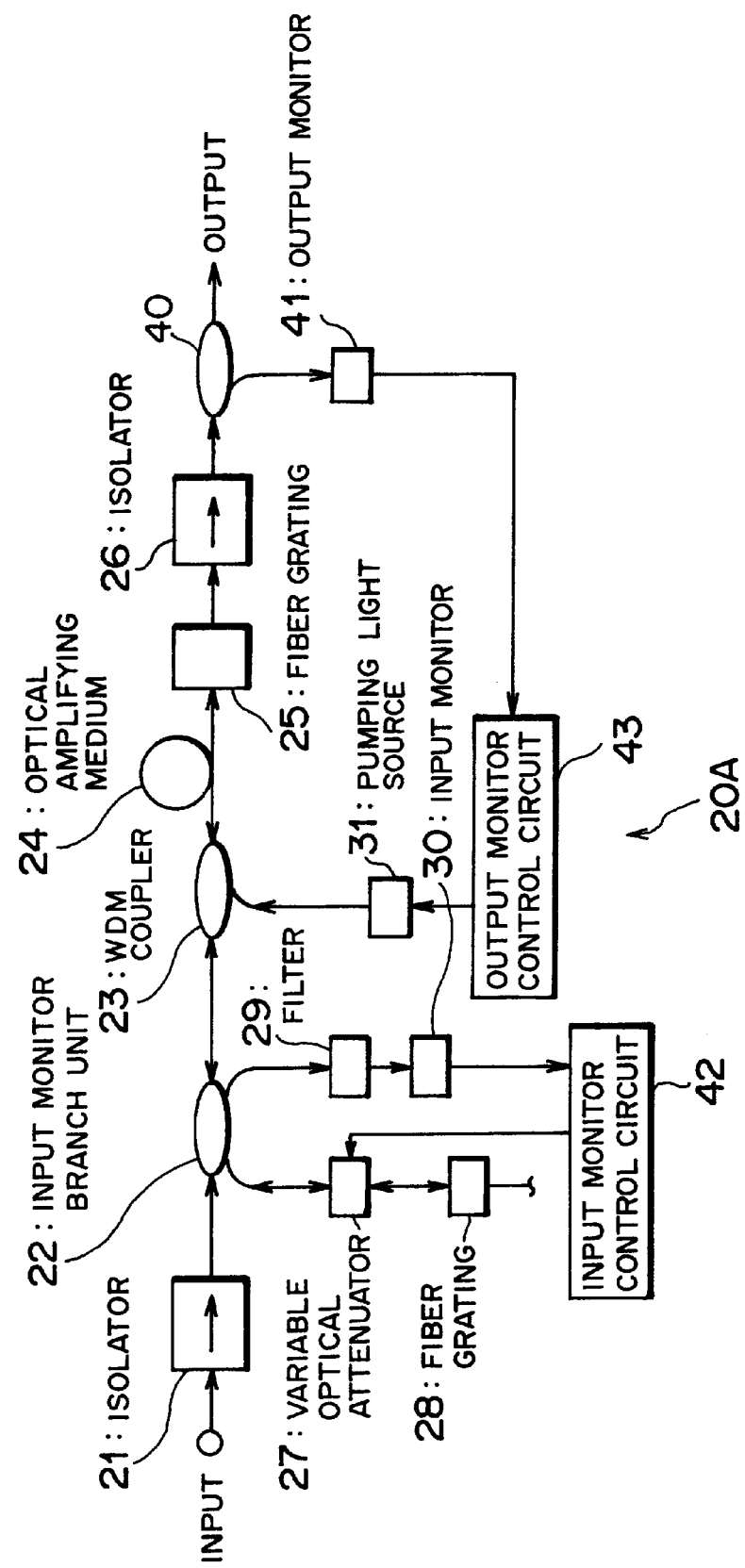
FIG. 21 is a block diagram illustrating the configuration of an optical amplifier according to a second embodiment of the present invention.

FIG. 21 is a block diagram illustrating the configuration of an optical amplifier according to a second embodiment.

Similar to the optical amplifier 20 illustrated in FIG. 3, an optical amplifier 20A illustrated in FIG. 21 can be used as an optical amplifier for amplifying an optical signal in the optical communications system 10 illustrated in FIG. 4.

Similar to the optical amplifier 20 illustrated in FIG. 3, the optical amplifier 20A illustrated in FIG. 21 can be used as the optical post-amplifier 15, the optical inline amplifier 16, and the optical pre-amplifier 17 illustrated in FIG. 4. In the second embodiment, an explanation will be particularly given of a case where the optical amplifier 20A is used as the optical post-amplifier 15.

The optical amplifier 20A illustrated in FIG. 21 is an optical amplifier which adopts a constant output control method. More specifically, the optical amplifier 20A is comprised of the optical amplifying medium 24, the pumping light source 31, the WDM (Wavelength Division Multiplexing) coupler 23, the input monitor branch unit 22, the fiber gratings 25 and 28, the input monitor 30, the variable optical attenuator 27, the filter 29, the isolators 21 and 26, an input monitor control circuit 42, an output monitor branch unit 40, an output monitor 41, and an output monitor control circuit 43.

More specifically, there are provided the isolator 21, the input monitor branch unit 22, the WDM coupler 23, the optical amplifying medium 24, the fiber grating 25, the isolator 26, and the output monitor branch unit 40 in order from the input side of the optical amplifier 20A.

As in the case of the optical amplifier 20 illustrated in FIG. 3, one optical branch path of the input monitor branch unit 22 is connected to the variable optical attenuator 27 and the fiber grating 28. Further, the filter 29 and the input monitor 30 are connected to the other optical branch path of the input monitor branch unit 22.

Further, similar to the optical amplifier 20 illustrated in FIG. 3, the pumping light source 31 is connected to the WDM coupler 23.

The input monitor 30 and the variable optical attenuator 27 of the optical amplifier 20A of the second embodiment are connected to the input monitor control circuit 42.

The output monitor 41 and the output monitor control circuit 43 are connected to the output monitor branch unit 40, and the output monitor control circuit 43 is connected to the pumping light source 31.

The optical amplifying medium 24, the pumping light source 31, the WDM coupler 23, the input monitor branch unit 22, the fiber gratings 25 and 28, the input monitor 30, the variable optical attenuator 27, the filter 29, and the isolators 21 and 26 are the same in function and configuration as those used in the first embodiment.

The input monitor control circuit 42 has the same function and configuration as that of the control circuit 32 in the first embodiment.

As illustrated in FIG. 21, the output monitor branch unit 40 is provided on the output side of the optical amplifying medium 24 and bifurcates the optical signal received from the optical amplifying medium 24 through the fiber grating 25 and the isolator 26. The thus-bifurcated signal is output to the output monitor 41 in the form of an output monitor signal in the 1.55 $\mu$m band.

The output monitor 41 monitors the light output from the optical amplifying medium 24 via the fiber grating 25 on the basis of the output monitor signal received from the output monitor branch unit 40. Then, the output monitor 41 outputs a signal to the output monitor control circuit 43 in the form of output light monitor information.

The output monitor control circuit 43 operates as follows, on the basis of the output light monitor information received from the output monitor 41. If the intensity of the output light becomes higher or lower than a preset threshold intensity, the output monitor control circuit 43 controls the intensity of the pumping light of the pumping light source 31 such that the intensity of the output light becomes equal to the preset threshold intensity.

The function of the control circuit 43 is implemented via software processing through use of; e.g., a processor.

With the previously-described configuration, the optical amplifier 20A of the second embodiment amplifies an optical signal while suppressing optical surges even when there is an abrupt increase in the input of the optical signal, by suppressing the cause of optical surges; i.e., an increase in the gain of the optical amplifying medium 24 associated with a reduction in the input of the optical signal, as is the case with the optical amplifier 20 of the first embodiment.

Figure 22:
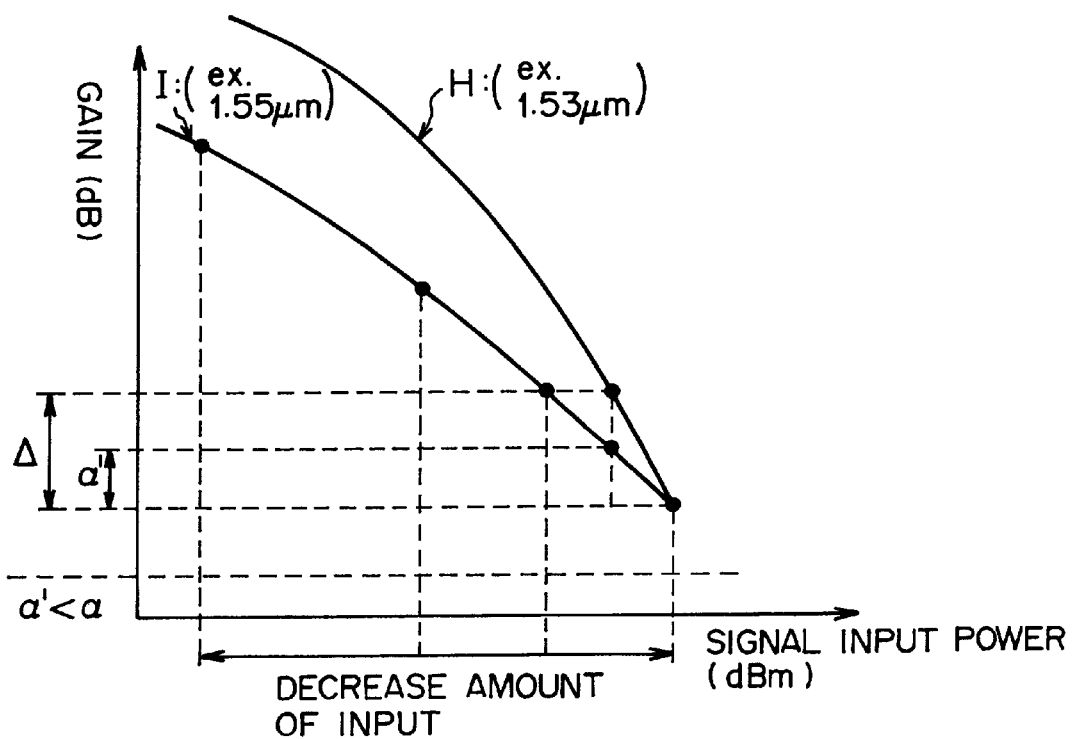
FIG. 22 is an illustrative plot for explaining an effect of suppressing optical surges in the optical amplifier of the second embodiment of the present invention.

The optical amplifier 20A adopts an output constant control method, and therefore the output monitor control circuit 43 performs a control operation in such a way that the intensity of the pumping light in the pumping light source 31 increases as the input light decreases. In contrast to the optical amplifier 20 of the first embodiment that adopts a pumping light power constant control method (see FIG. 16), as illustrated in FIG. 22, the degree of increase in the gain of the optical amplifying medium 24 associated with the reduction in the input light becomes large (see curves H and I in FIG. 22).

For this reason, the optical amplifier 20A becomes more apt to cause oscillation in the 1.53 μm band when compared to the optical amplifier 20 having the pumping light power constant control method. Consequently, optical surges can be more effectively suppressed.

As described above, the optical amplifier 20A of the second embodiment is provided with the fiber gratings 25 and 28 disposed on the input and output sides of the optical amplifying medium 24, as well as with the input monitor 30, the variable optical attenuator 27, and the input monitor control circuit 42. The input monitor 30 monitors the light input to the optical amplifying medium 24 from the input port, and the input monitor control circuit 42 controls the amount of attenuation of the oscillated light in the variable optical attenuator 27 on the basis of the results of such monitoring. As a result, it is possible to produce the same effects as those produced by the optical amplifier 20 of the first embodiment.

Further, the optical amplifier 20A of the second embodiment adopts an output constant control method, and therefore the output monitor control circuit 43 performs a control operation in such a way that the intensity of the pumping light in the pumping light source 31 increases as the input light decreases. The degree of increase in the gain of the optical amplifying medium 24 associated with the reduction in the input light becomes large.

For this reason, the optical amplifier 20A becomes more apt to cause oscillation in the 1.53 μm band. Consequently, optical surges can be more effectively suppressed.

(d) Others

In the previous first and second embodiments, although an explanation has been given of a case where the optical amplifiers 20 and 20A are used as the optical post-amplifier 15 in the optical communications system 10 illustrated in FIG. 4, the optical amplifiers 20 and 20A can be also used as the optical inline amplifier 16 and the optical preamplifier 17 illustrated in FIG. 4, as previously described.

In a case where the optical amplifiers 20 and 20A are used as the optical inline amplifier 16 disposed in the vicinity of the transmission system 11 illustrated in FIG. 4, the oscillated light output from the optical inline amplifier 16 can propagate through the optical amplifiers on subsequent stages one after another, which in turn enables suppression of occurrence of optical surges in the optical amplifiers on the subsequent stage.

In a case where the optical amplifiers 20 and 20A are used as the optical preamplifier 17 disposed in front of the receiving system 13 illustrated in FIG. 4, the optical signal can be amplified and output to the receiving system 13 while optical surges are suppressed.

As a result, the intensity of the optical signal is prevented from imposing an excessive load on the optical components of the light receiving section which receive the optical signal, to such an extent that the load exceeds the tolerances of the optical components. This in turn results in improved durability of the optical receiving components and the receiving circuit, which in turn makes it possible to realize stable optical communication.

The optical preamplifier 17 is generally provided with a filter for permitting passage of only the optical signal to the output side of the optical amplifying medium, and therefore the transmitted oscillated light is eliminated by the filter.

For this reason, there is no output of the oscillated light from the optical preamplifier 17, thereby enabling prevention of the influence of the oscillated light on the receiving system 13.

Figure 23:
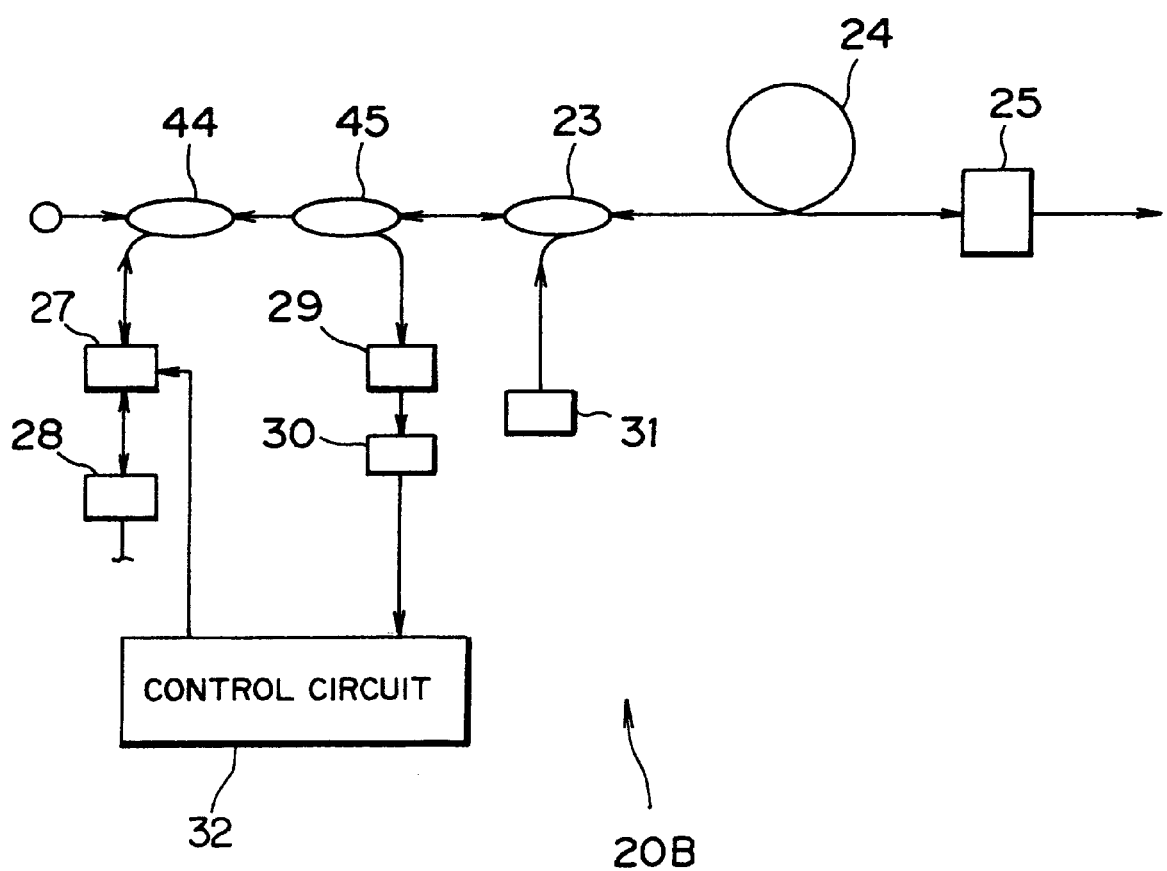
FIG. 23 is a block diagram illustrating another configuration of the optical amplifier used in the optical communications system shown in FIG. 4.

In the optical communications system 10 illustrated in FIG. 4, the optical amplifier and the optical amplifying apparatus illustrated in FIGS. 23 and 24 may be used as the optical post amplifier 15, the optical inline amplifier 16, and the optical preamplifier 17.

An optical amplifier 20B illustrated in FIG. 23 has the optical amplifying medium (amplifying medium) 24 which amplifies input light through use of excitation energy of pumping light and outputs the amplified light. The optical amplifier 20B is characterized by comprising: the pumping light source 31 for producing pumping light; the WDM coupler 23 for introducing pumping light which introduces the pumping light received from the pumping light source 31 into one end of the optical amplifying medium 24; an input monitor branch unit 45 which is provided on the input side of the optical amplifying medium 24 and serves as a first branch coupler for bifurcating an optical signal output to the optical amplifying medium 24 and for outputting the thus-bifurcated optical signal as an input monitor signal in the 1.55 μm band (i.e., a first branch signal); an oscillated light branch unit 44 which is provided on the output side of the input monitor branch unit 45 and serves as a second branch coupler for bifurcating an optical signal received from the optical amplifying medium 24 and for outputting the thus-bifurcated optical as oscillated light in the 1.53 μm band (i.e., a second branch signal); the fiber gratings 28 and 25 which are provided on the input and output sides of the optical amplifying medium 24 via the oscillated light branch unit 44 and are capable of reflecting light with a predetermined wavelength different from a signal wavelength contained in the input light; the input monitor 30 which monitors the light input to the optical amplifying medium 24 on the basis of an input monitor signal received from the input monitor branch unit 45; the variable optical attenuator (variable attenuator) 27 for attenuating the oscillated light received from the oscillated light branch unit 44 to a predetermined level and for outputting the attenuated oscillated light to the fiber grating 28 disposed in the vicinity of the oscillated light branch unit 44; and the control circuit 32 that controls the amount of attenuation of the oscillated light at the variable optical attenuator 27, on the basis of input light monitor information received from the input monitor 30, in such a way that the gain of the amplifying medium 24 decreases to a value lower than a predetermined value if the intensity of the input light has decreased to a value lower than a preset threshold value.

At this time, although the oscillated light branch unit 44 may be formed from a power branch coupler which bifurcates the power of the input light, it may be formed from a wavelength division multiplexing (WDM) separation coupler which separates a signal light wavelength (in the 1.55 $\mu$m band) from a predetermined wavelength (in the 1.53 $\mu$m band) that is reflected by the fiber grating 28 through WDM separation.

The input monitor branch unit 45 needs to be formed from a power branch coupler which bifurcates the power of the input light.

Even in this case, the same operation and effects as those produced by the optical amplifier 20 of the first embodiment can be produced.

When the oscillated light branch unit 44 is formed from a wavelength division multiplexing coupler, the oscillated light bouncing back and forth within the optical amplifier 20B can be prevented from emerging from the input port of the optical amplifier 20B. Further, it is possible to reduce insertion losses at the signal light wavelength, as well as a noise factor of the optical amplifier 20.

With regard to the optical amplifier 20B illustrated in FIG. 23, an explanation has been given of a case where the oscillated light branch unit 44 is interposed between the optical amplifying medium 24 and the fiber grating 28 disposed on the input side of the optical amplifying medium 24. The oscillated light branch unit 44 may be interposed between the optical amplifying medium 24 and the fiber grating 25 disposed on the output side of the optical amplifying medium 24.

An optical amplifying apparatus 46 illustrated in FIG. 24 has at least more than two optical amplifiers 47 which are connected together, each of which has the optical amplifying medium (amplifying medium) 24 that amplifies input light through use of excitation energy of pumping light and outputs the amplified light. The optical amplifying apparatus 46 is characterized by the fact that the optical amplifier 47 disposed on the first stage comprises: the pumping light source 31 for producing pumping light; the WDM coupler 23 which serves as a pumping light introduction coupler for introducing the pumping light received from the pumping light source 31 into one end of the optical amplifying medium 24; the oscillated light branch unit 44 which is disposed on at least either the input or output side of the optical amplifying medium 24 and bifurcates the signal light received from the optical amplifying medium 24; the fiber gratings 28 and 25 which are capable of reflecting light with a predetermined wavelength different from a signal wavelength contained in the input light and are disposed on the input and output sides of the optical amplifying medium 24 via the oscillated light branch unit 44; the fiber grating 28 disposed on the input side of the optical amplifying medium 24 being set in such a way that its reflectance becomes higher than that of the fiber grating 25 disposed on the output side of the optical amplifying medium 24.

Even in this case, the same operation and effects as those produced by the optical amplifier 20 of the first embodiment can be produced.

The optical amplifying apparatus 46 illustrated in FIG. 24 is capable of preventing propagation of optical surges to the optical amplifiers 47 disposed on subsequent stages by suppressing occurrence of the optical surges in the optical amplifier 47 on the first stage. As a result of provision of the fiber grating 28 having a high reflectance on the input side of the optical amplifying medium 24 and of the fiber grating 25 having a low reflectance on the output side of the same, oscillated light output from the optical amplifier 47 on the first stage can be propagated to the optical amplifiers 47 on the subsequent stages one after another, thereby further enabling suppression of occurrence of optical surges in the optical amplifier 47 on the subsequent stages.

As a result, the intensity of the signal light is prevented from imposing an excessive load on the optical components of the light receiving section which receive the optical signal, to such an extent that the load exceeds the tolerances of the optical components. This in turn results in improved durability of the optical receiving components and the receiving circuit, which in turn makes it possible to realize stable optical communication.

In practice, it is difficult to manufacture the fiber gratings 25 and 28 having reflectances as designed. For this reason, it is also possible to place; e.g., a variable optical attenuator and a semi-fixed optical attenuator, in front of the fiber grating 28 so that the intensity of oscillated light is variably attenuated by the attenuators. As a result, amounts by which the fiber gratings 25 and 28 reflect the oscillated light is regulated, which makes it possible to regulate the gain of the optical amplifying medium 24.

As a matter of course, if the fiber gratings 25 and 28 having reflectances as designed can be manufactured, the optical amplifier 47 can be formed without use of the variable optical attenuator and the semi-fixed optical attenuator.

With regard to the previously-described optical amplifier 20 (see FIG. 3), the optical amplifier 20A (see FIG. 21), the optical amplifier 20B (see FIG. 23), and the optical amplifying apparatus 46 (see FIG. 24), the explanations have been given of the case where the reflectance of the fiber grating 28 disposed on the input side of the optical amplifying medium 24 is set so as to become higher than that of the fiber grating 25 disposed on the output side of the same. However, if it is unnecessary to propagate the oscillated light bouncing back and forth within the optical amplifiers 20, 20A, 20B or the optical amplifying apparatus 46 to the optical amplifiers or the like provided on the subsequent stages, or if it is necessary to prevent the propagation of the oscillated light to the optical amplifiers disposed on the subsequent stages, the reflectance of the fiber grating 25 can be increased so as to equal that of the fiber grating 28.

The previous optical amplifier 20 (see FIG. 3), the optical amplifier 20A (see FIG. 21), and the optical amplifier 20B (see FIG. 23) are provided with the input monitor 30 and the control circuit 32 or the input monitor control circuit 42. The explanations have been given of the case where if the intensity of the input light becomes lower than a preset threshold value, the control circuit 32 or the input monitor control circuit 42 controls the amount of attenuation of the oscillated light at the variable optical attenuator 27, on the basis of input light monitor information received from the input monitor 30, in such a way that the gain of the amplifying medium 24 decreases to a value lower than a predetermined value. Alternatively, if the timing at which the intensity of the input light decreases or the amount of reduction in the intensity of the input light is apparent without monitoring the input light through use of the input monitor 30, the input monitor 30 can be eliminated.

Further, for example, if an operator manually controls the amount of attenuation of the oscillated light at the variable optical attenuator 27, the control circuit 32 or the input monitor control circuit 42 becomes unnecessary.

(e) Description of Modifications of the Respective Embodiments (1) Introduction An erbium-doped fiber optical amplifier (EDFA) is one of optical amplifiers whose introduction into an optical transmission system, primarily into a trunk line, is proceeding.

Relaxation time of the EDFA is about 10 ms, and hence one of the major characteristics of the EDFA is prevention of pattern effects even in the case of a large degree of gain saturation of the EDFA. For this reason, in an optical amplification multirelay transmission system, each of the EDFAs is efficiently operating with a saturated gain.

However, if an optical signal re-enters the EDFA at the point in time when a hit arises in the input to the EDFA, and the gain returns from the saturated level, optical surges develop.

Figures 25A, 25B:
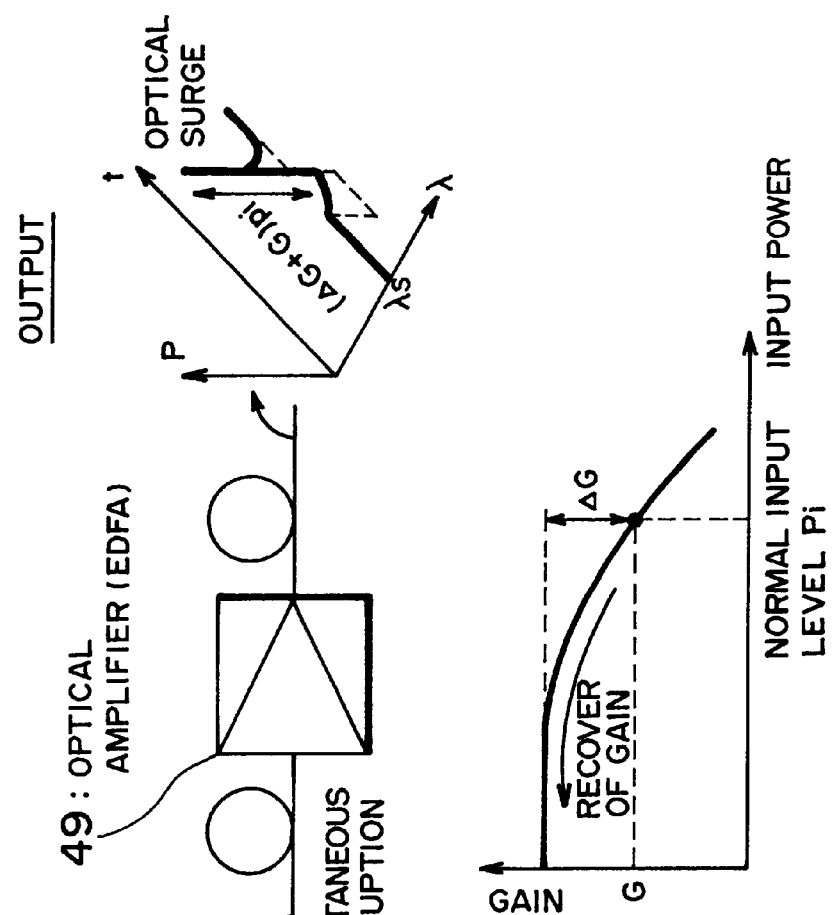
FIGS. 25(a) and 25(b) are illustrative representations for explaining generation of optical surges in the optical amplifier.

As illustrated in FIG. 25(*a*) in detail, if the input to the EDFA 49 is interrupted instantaneously, the gain of the EDFA 49 returns from the saturated level during the period of the interruption of the input as illustrated in FIG. 25(*b*). If there is an input of light having the same intensity as that of the light input before the interruption of the light input when the gain of the EDFA 49 returns from the saturated level, an excessive optical output arises in the EDFA 49 as illustrated in FIG. 25(*a*) because the gain of the EDFA 49 remains in a high state.

If the optical signal is continuously input, exactly as it is, the gain of the EDFA 49 returns to the previous gain. As a result, the optical output instantaneously reaches a high value and, then, gradually decreases to a steady-state value. Such transient excessive optical outputs will be hereinafter referred to as optical surges.

In many cases, the optical amplifier is controlled so as to produce output light with a constant intensity through use of feedback on the power of the pumping light. In this case, the power of the pumping light reaches the maximum at the time of the stoppage of the light input, thereby resulting in much higher optical surges.

A method of suppressing optical surges through use of compensated light (or dummy light) has been studied until now. However, in terms of the fact that the erbium-doped fiber (EDF) itself acts as an amplifying medium, it is also possible to consider that optical surges are prevented by intentionally causing laser oscillation at a wavelength differing from that of the optical signal before the gain increases as a result of recovery of the gain from the saturated level (i.e., by causing oscillated light with a wavelength different from that of the signal light) so as to mitigate accumulation of the energy in the EDFA associated with a reduction in the input of the optical signal.

According to this method, the EDFA can be simply formed because of elimination of the necessity of preparing dummy light, thereby enabling realization of high-speed response of the order of submicrometers (substantially equal to the period of time required for a round trip of light within a resonator).

If the laser is operated at a wavelength differing from that of the signal light, the laser light (or oscillated light) can be easily eliminated.

A method of suppressing optical surges by means of laser operation of the EDFA will be proposed, and experimental results on the suppression of optical surges will be described in detail.

(2) A method of suppressing optical surges by means of laser operation of the EDFA During ordinary operations, the gain of the EDFA is saturated. Even if the EDFA is used while the gain is saturated, no problem arises in the quality of transmission. This is a tremendous advantage. However, this is the cause of optical surges.

Use of the EDFA while its gain is saturated is very effective in reducing the power of the required pumping light. For this reason, the methods of suppressing optical surges reported until now are more realistically directed to how to suppress the recovery of gain from the saturated level when an input of a signal is interrupted, instead of to use the EDFA without saturating it.

For example, according to a method which uses dummy light, the recovery of the gain of the EDFA from the saturated level is prevented by inputting dummy light instead of an optical signal when the input of the optical signal is interrupted. However, it is difficult to deny the complexity of control of dummy light sources which are active components and are provided for respective optical amplifiers.

In view of the fact that the EDF itself acts as an amplifying medium, it is also possible to consider that optical surges are prevented by intentionally causing laser oscillation at a wavelength differing from that of the signal light at a point in time when the gain increases as a result of recovery of the gain from the saturated level so as to mitigate accumulation of the energy in the EDFA associated with a reduction in the input of the optical signal.

More specifically, if laser oscillation arises, the gain of the EDFA is fixed (clamped) to a threshold gain, and hence the recovery of the gain from the saturated state is suppressed.

In order to cause laser oscillation, it is necessary to provide the optical amplifier with two reflecting mirrors (or reflecting members) which have wavelength selectivity and form a laser resonator.

At this time, a wavelength at which laser oscillation arises (or the wavelength of oscillated light) must be different from the wavelength of the signal light.

The reason for this is that if the laser is oscillated at the same wavelength as that of the signal light, the resultant laser light may be transmitted in a downstream direction (or toward the subsequent stages), thereby damaging the optical amplifiers and optical receiver provided in the downstream direction.

If the laser is oscillated at a wavelength differing from that of the optical signal, laser light can be eliminated by providing an optical output port of each optical amplifier, from which output light is output, with an optical filter which permits passage of only light having the signal light wavelength and elimination of light having a wavelength that is reflected by the reflecting members (or the wavelength of the laser light).

If consideration should be given to the protection of only the optical receiver, it is not necessary to provide the respective optical amplification relays with the optical filters. Only the optical receiver should be provided with the optical filter. However, the optical receiver of the optical amplification relay transmission system is originally provided with an narrow-band optical filter. In this case, therefore, it is not necessary to provide the optical receiver with the optical filter.

Even in the case of setting of a threshold gain for the laser oscillation, it is also necessary to cause lasing operations at a different wavelength.

This is because, if the laser is oscillated at the same wavelength as that of the signal light, it is necessary to set the threshold gain of the laser so as to become higher than the gain obtained when the laser operates at the minimum input. If the threshold gain is set too large, laser oscillation arises when the gain is sufficiently restored from the saturated level, thereby eliminating the effect of suppressing optical surges.

Further, if the threshold gain is set to a value close to the gain of the laser obtained when it operates at the minimum input, relative intensity noise (RIN) increases, which makes it impossible to implement a low-noise optical amplifier.

In the end, it is necessary to cause the laser to operate at a wavelength differing to that of the EDFA in order to suppress optical surges by utilization of the lasing operation of the EDFA. In order to effectively reduce the accumulation of energy when the gain is restored, it is necessary to select as laser wavelengths ① a wavelength at which the degree of recovery of the gain is higher than the wavelength of the signal light when there is a reduction in the input of the signal light;

② a wavelength at which the laser light is easily eliminated; and

③ a wavelength at which it is possible to ensure a sufficient amount of reflective attenuation of the two reflecting mirrors connected to the input and output ends of the EDF with respect to the signal light.

Figure 26:
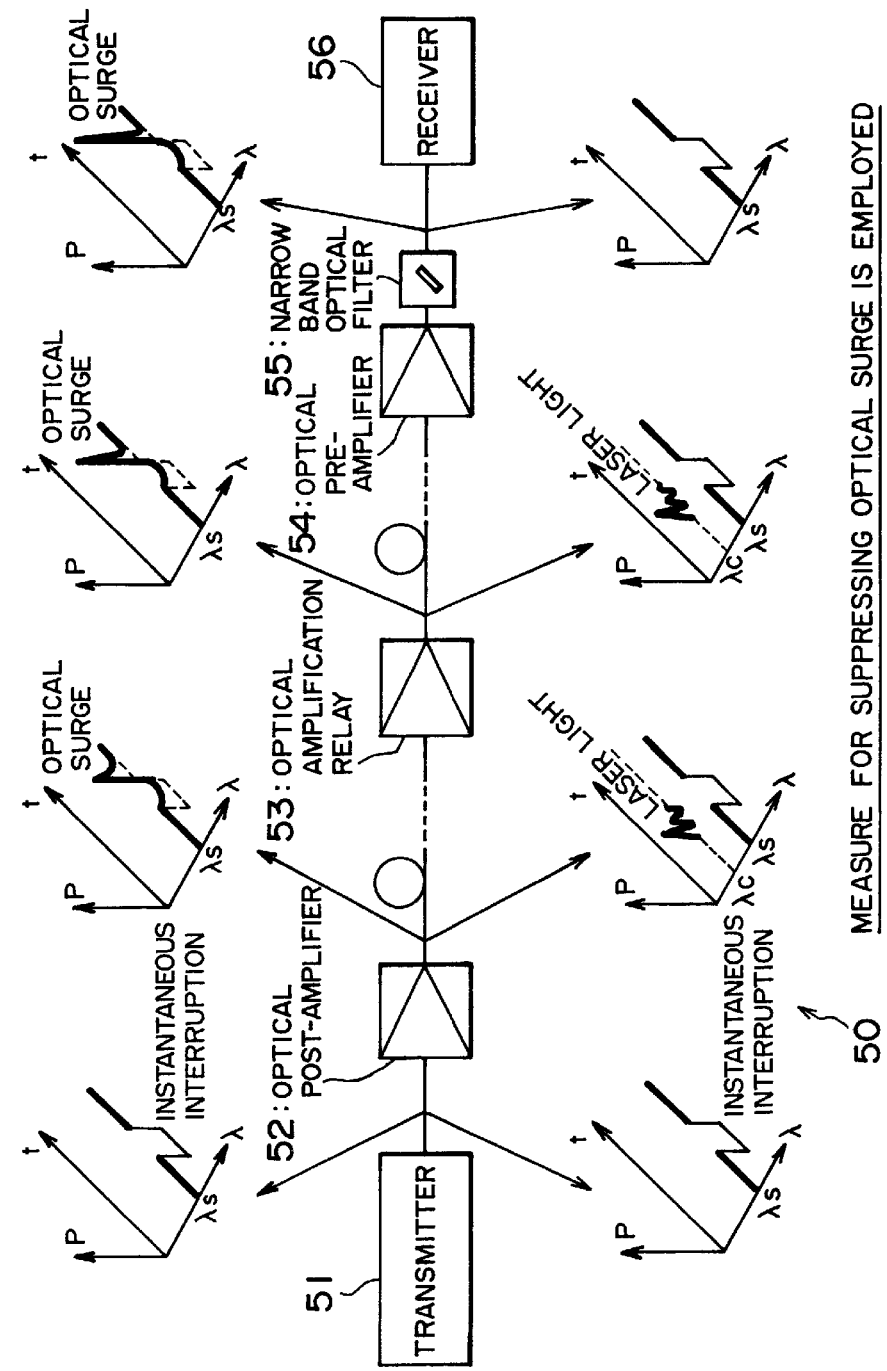
FIG. 26 is an illustrative schematic representation for explaining the generation of optical surges in an optically amplifying multirelay transmission system and the suppression of the optical surges by means of lasing operation of the optical amplifier.

This method is also considered to be effective for a multirelay transmission system 50 as illustrated in FIG. 26.

As illustrated in FIG. 26, for example, if an input to an optical post amplifier 52 from a transmitter 51 is interrupted instantaneously, optical surges arise in the optical post amplifier 52 if there are no remedies for optical surges. These optical surges are further amplified by an optical amplification relay 53 and an optical preamplifier 54 provided downstream from the optical post amplifier 52, and the thus-amplified optical surges are input to a receiver 56 (see "No Remedies for Optical Surges" in FIG. 26).

Similarly, for example, if an input to the optical post amplifier 52 from the transmitter 51 is interrupted instantaneously, and there are remedies for optical surges, laser light is output from the optical post amplifier 52 at a wavelength ($\lambda_c$) differing from the signal light wavelength (see "Remedies for Optical Surges" in FIG. 26).

Therefore, as illustrated in FIG. 26, no interruption arises in the input to the optical amplification relay 53 downstream from the optical post amplifier 52, nor does excessive recovery of the gain from the saturated level occur.

The laser light is eliminated by a narrow-band optical filter 55 disposed on the output side of the optical preamplifier 54.

The schematic representations illustrated in FIG. 26 are based on the assumption that neither the optical post amplifier 52 nor the optical amplification relay 53 houses an optical filter for eliminating laser light like the optical filter 55.

(3) Experimental Suppression of Optical Surges

In this experiment, a wavelength in the 1530 nm band, at which the degree of recovery of the gain is large when the gain is restored from the saturated level, is considered as a laser wavelength. The recovery of the gain at a wavelength of this band (in the 1530 nm band) associated with a reduction in the input of an optical signal was observed.

Figure 27:
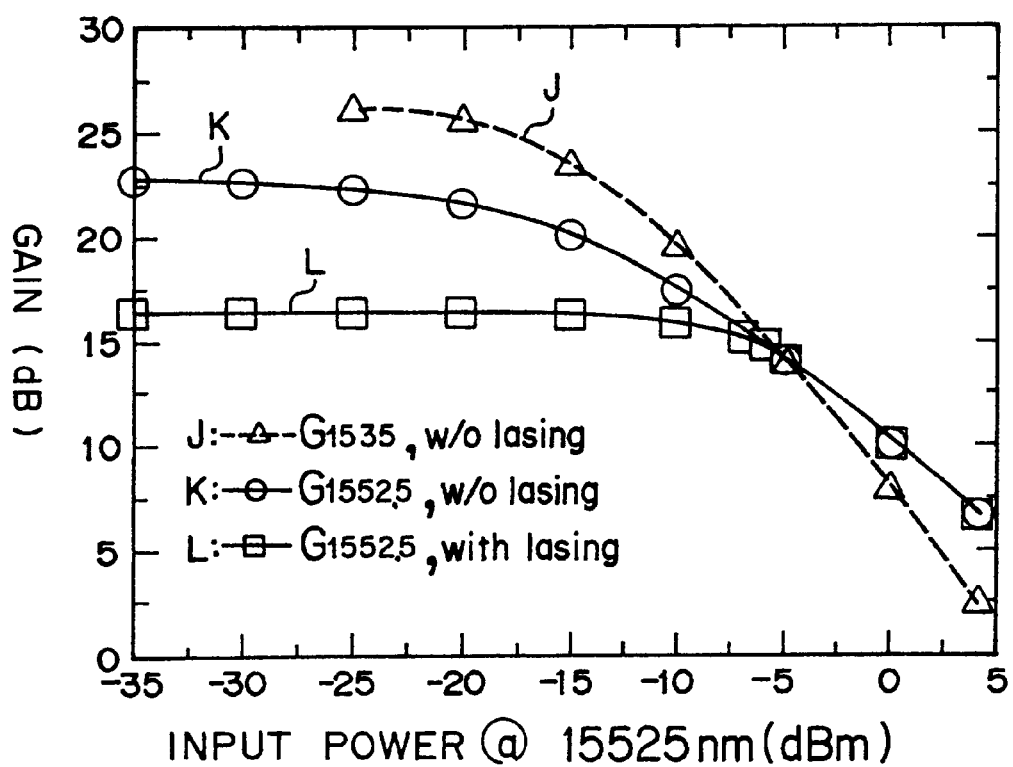
FIG. 27 is a plot illustrating one example of the signal-input-vs.-gain characteristics of the amplifier.

FIG. 27 illustrates signal-input-vs.-gain-characteristics of a 1480 nm back excitation type EDFA.

In FIG. 27, a narrow solid line indicated by K and a narrow broken line indicated by J depict the respective gains of the EDFA measured by simultaneously inputting to the EDFA signal light with a wavelength of 1552.5 nm and probe light with a wavelength of 1535 nm which is constantly lower than the wavelength of the signal light by 20 dB. The narrow solid line K depicts the recovery of the gain of the EDFA at the signal wavelength associated with a reduction in the input of the optical signal, and the narrow broken line J depicts the recovery of the gain of the EDFA at the wavelength of 1535 nm.

From these results, it is seen that the gain of the EDF is quickly restored at the wavelength of 1535 nm associated with a reduction in the input of the optical signal, and the magnitude of the thus-recovered gain is large.

It is also possible to implement reflecting mirrors having high reflectances only at this wavelength (in the 1530 nm band). Concurrently, the laser light is easily eliminated through use of an ordinary optical filter, and hence the 1530 nm band was selected as the laser wavelength.

Figure 28:
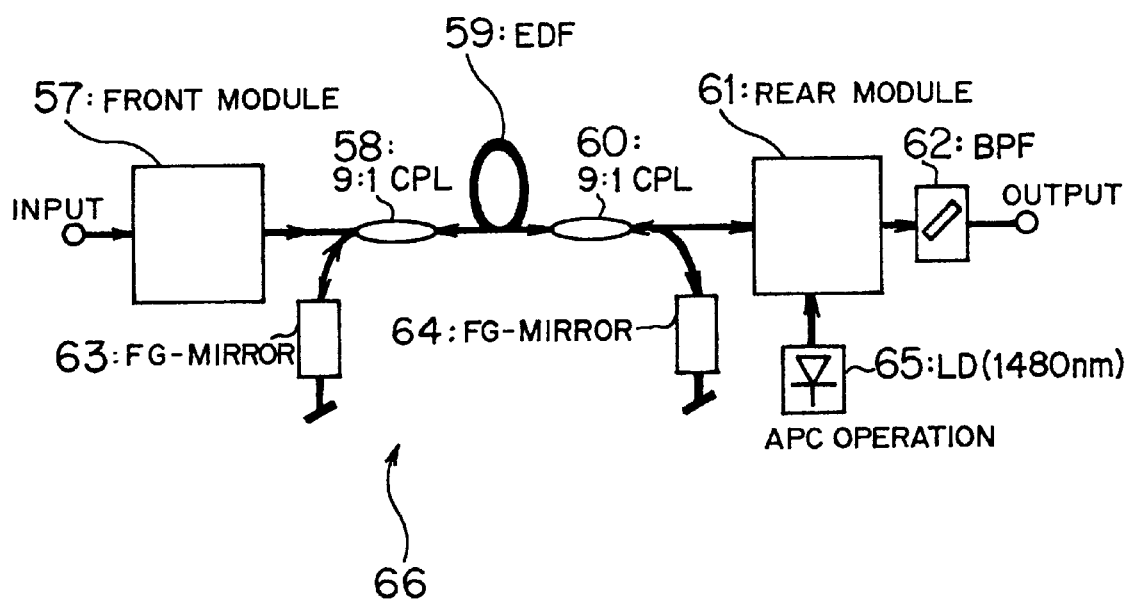
FIG. 28 is a block diagram illustrating the configuration of an optical amplifier which has a built-in laser resonator.

In an erbium-doped optical amplifier (EDFA) 66 as illustrated in FIG. 28, fiber grating reflection mirrors (FG-mirrors) 63 and 64 are connected to both sides of an erbium-doped fiber (EDF) 59 via 9-to-1 optical branch couplers (9-to-1 CPLs) 58 and 60, thereby forming a laser resonator in the 1530 nm band. In FIG. 28, reference numeral 57 designates a front optical member (front module); 61 designates a rear optical member (rear module); 65 designates an automatically-power-controlled (APC operated) pumping light source (LD) for producing pumping light with a wavelength of 1480 nm; and 62 designates an optical filer (BPF) for eliminating laser light in the 1530 nm band.

Figure 29A:
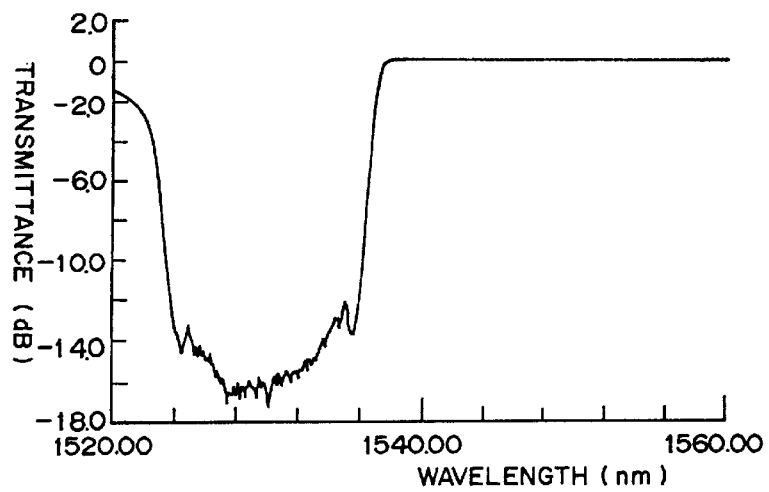
FIGS. 29(a) and 29(b) are plots, each of which illustrates the transmittance of a fiber grating reflection mirror.
Figure 29B:
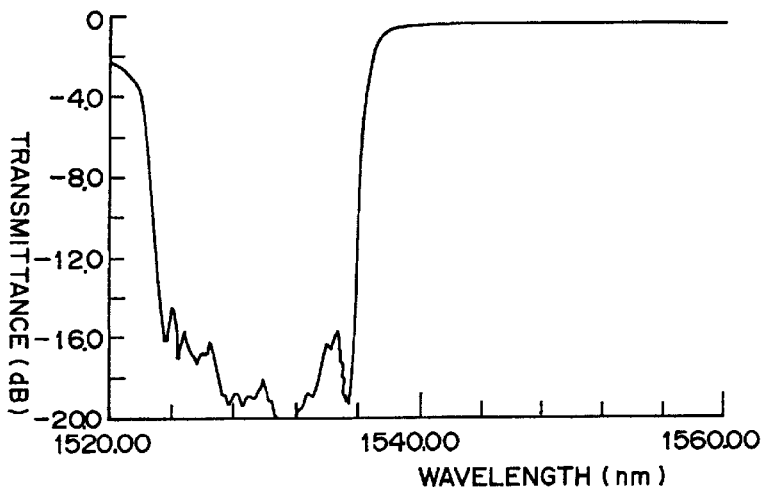

As illustrated in FIGS. 29(a) and 29(b), the fiber grating reflection mirrors 63 and 64 used in the experiment have their reflectances of more than 80% within wavelengths of 1524 to 1536 nm as well as sharp wavelength characteristics.

FIG. 29(a) illustrates the wavelength characteristics of the fiber grating reflection mirror 63 disposed on the input side of the EDF 59, and FIG. 29(b) illustrates the wavelength characteristics of the fiber grating reflection mirror 64 disposed on the output side of the EDF 59. Here, the reflectance can be estimated by (1- the transmittance of the reflection mirror).

The reflectances of the fiber grating reflection mirrors 63 and 64 were changed by connecting the 9-to-1 optical branch couplers 58 and 60 to the input and output sides of the EDF 59 such that one tenth of the input light was branched (power branch), and by adding splice losses to the input sections of the fiber grating reflection mirrors 63 and 64, thereby controlling the threshold gain used for commencing laser operations.

As illustrated in FIG. 28, the EDFA 66 with a laser resonator had the signal-input-vs.-signal-gain characteristics as shown by a thick solid line L in FIG. 27. The laser commenced operation at the wavelength of 1533 nm with an input signal power lower than −6 dBm. In a range of signal input levels lower than −6 dBm, the gain of the EDFA was clamped to 16.4 dB.

Figure 30A:
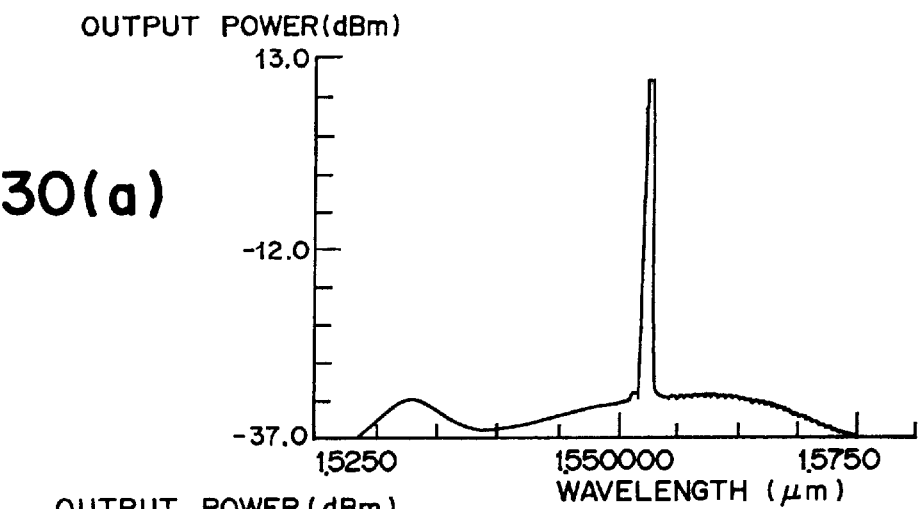
FIGS. 30(a) to 30(c) are plots, each of which illustrates an output spectrum of the optical amplifier with a built-in laser resonator for each input level.
Figure 30B:
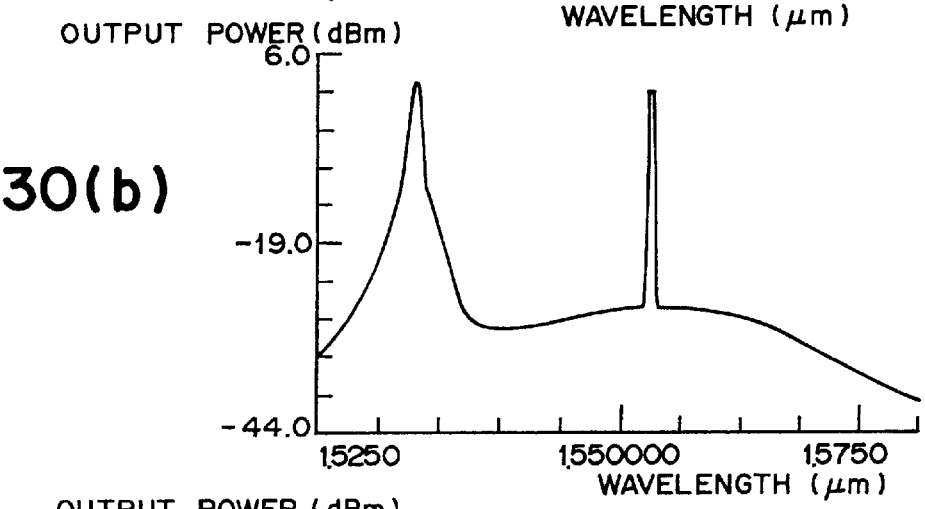
Figure 30C:
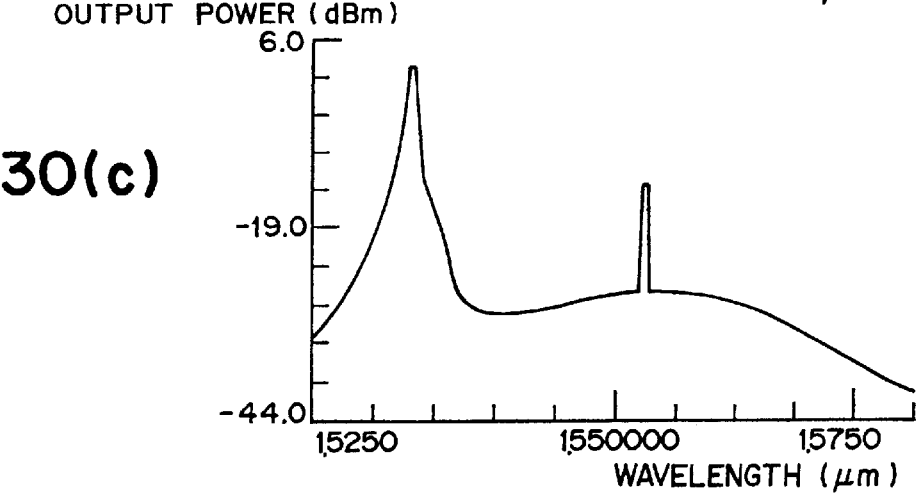

FIGS. 30(a) to 30(c) illustrate output spectra obtained at respective input levels. More specifically, FIGS. 30(a) to 30(c) illustrate output spectra obtained at input intensities (Pi) of 0 dBm, −15 dBm, and −30 dBm.

Figure 31A:
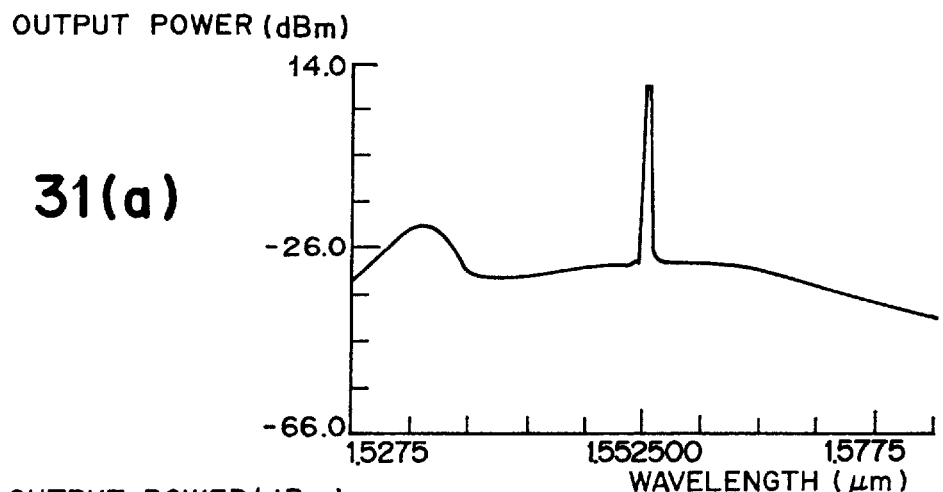
FIGS. 31(a) to 31(c) are plots, each of which illustrates an output spectrum in the vicinity of a threshold value for lasing operation.
Figure 31B:
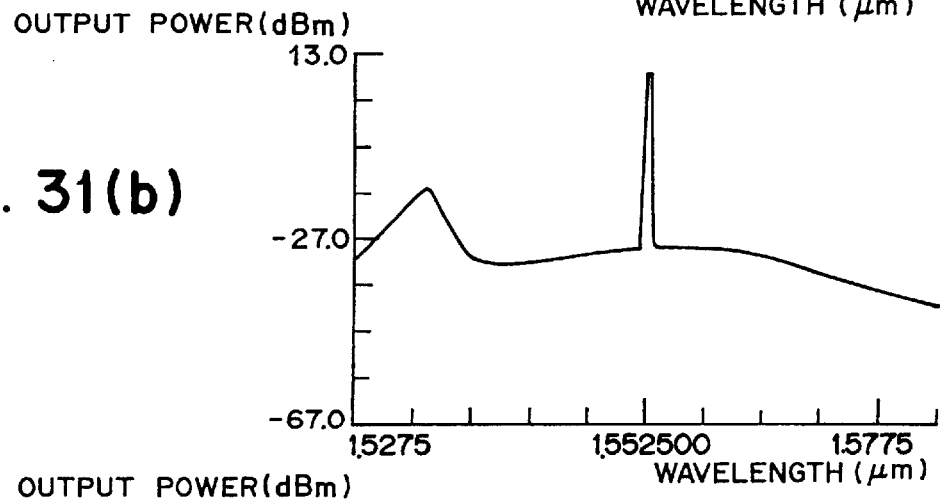
Figure 31C:
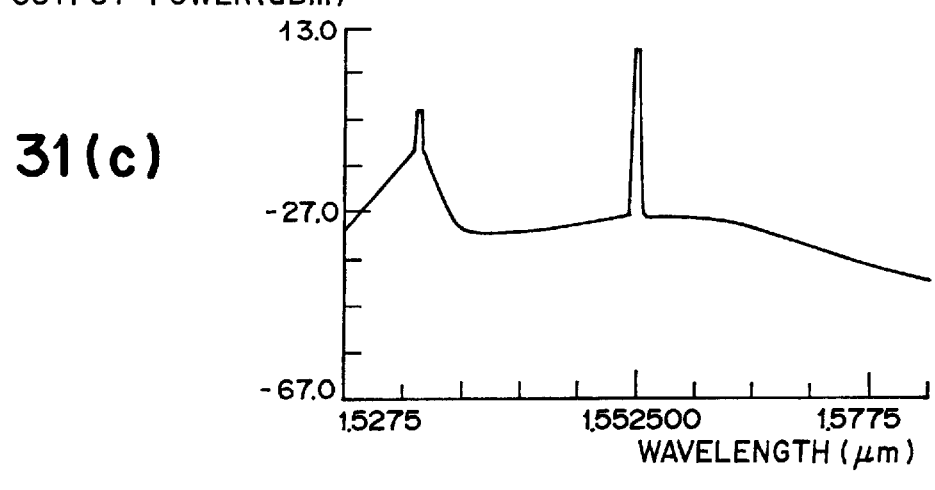

Further, FIGS. 31(a) to 31(c) illustrate output spectra obtained in the vicinity of a threshold value for laser operations. More specifically, FIGS. 31(a) to 31(c) respectively illustrate output spectra obtained at input intensities (Pi) of −5 dBm, −6 dBm, and −7 dBm.

As illustrated in FIG. 31(b), an input intensity (Pi) of −6 dBm is considered to be a threshold value for laser operations. In FIG. 31(b), the spectrum has a peak in the 1530 nm band.

Further, as illustrated in FIG. 31(c), it is understood that the laser oscillates at the wavelength of 1533 nm when the input (Pi) is −7 dBm.

Figure 32A:
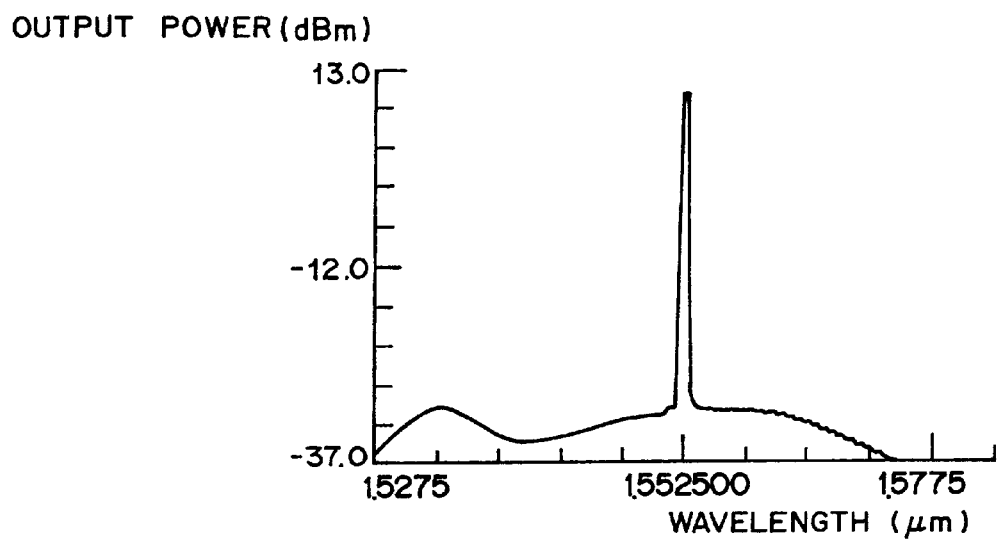
FIGS. 32(a) and 32(b) are illustrative plots showing output spectra obtained when a laser resonator is present and when no laser resonator is present.
Figure 32B:
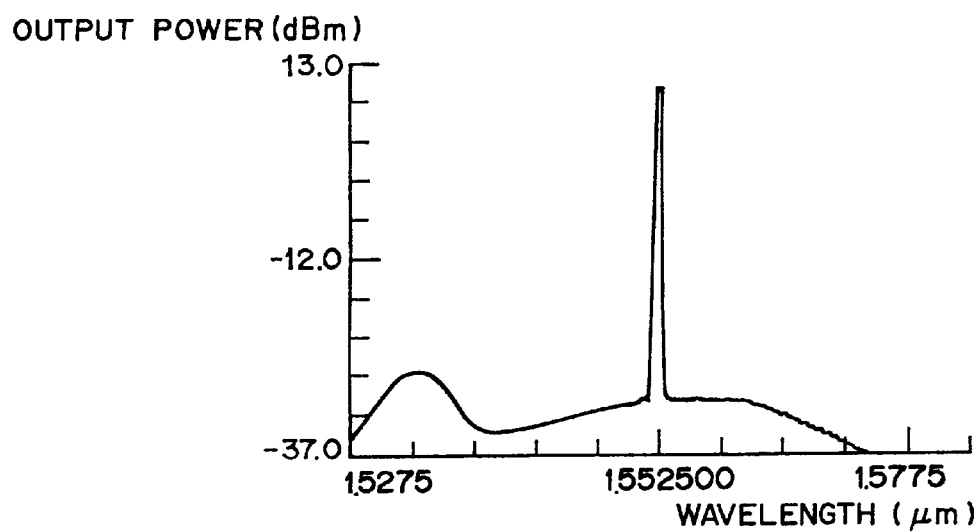

FIGS. 32(a) and 32(b) illustrate output spectra at an input of −3 dBm at which laser oscillation does not occur. FIG. 32(a) illustrates an output spectrum obtained in a case where there is not any a laser resonator, and FIG. 32(b) illustrates an output spectrum obtained in a case where there is a laser resonator.

As illustrated in FIG. 32(b), there is a peak of spontaneously emitted light (ASE) in the 1530 nm band under the influence of multiple reflection in a case where there is a laser resonator. Although this plot is compared with the plot in FIG. 32(a) while the longitudinal axes of the plots are extended, there is not any increase in the ASE at the signal wavelength.

In the optical amplifier having the laser resonator, an effect of suppressing optical surges due to laser operations was ascertained as a result of turning on-and-off of the input light through use of an AO switch (Acoustooptic switch). The AO switch is an optical switch which utilizes an acoustooptic effect.

This experiment was based on the assumption that the minimum input intensity was −3 dBm, and that a turn-on level was −3 dBm. In this state, the turn-off level was −67 dBm, and a rise time was 0.2 μm or less.

Figure 33A:
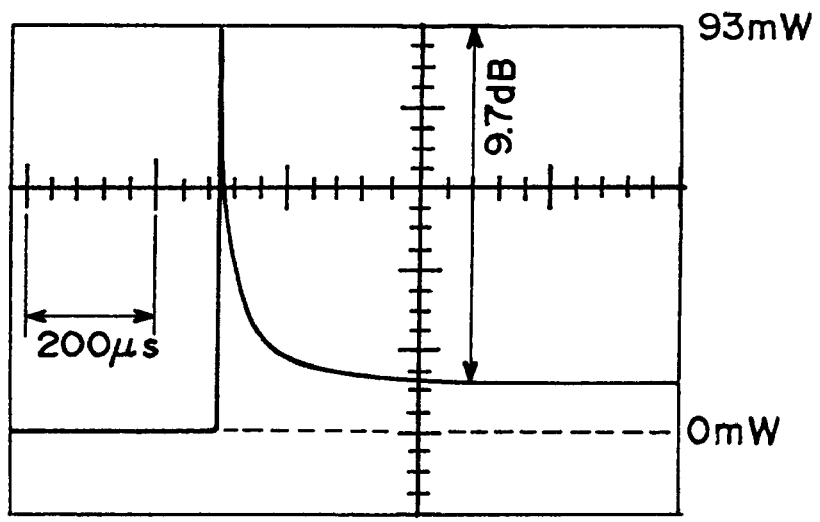
FIGS. 33(a) and 33(b) are illustrative plots showing optical surges that are generated when a laser resonator is present and when no laser resonator is present.
Figure 33B:
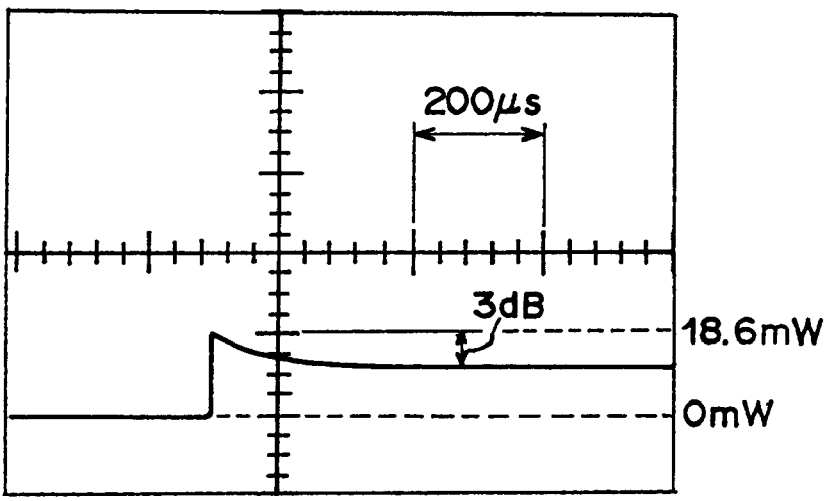

As illustrated in FIG. 33(a), in a case where laser operations were not performed (i.e., there was no laser resonator), optical surges of 9.7 dB occurred. In contrast, as illustrated in FIG. 33(b), in a case where laser operations were performed (i.e., there was a laser resonator), the optical surges decreased to 3 dB. As a result, an effect of suppressing optical surges by 6.7 dB can be ascertained.

The generation of optical surges of 3 dB is due to the fact that the experiment was performed at an input of −3 dBm, and that laser operations occurred in the vicinity of −6 dBm as illustrated in FIG. 31(b). For these reasons, even in the case of the EDFA with the laser resonator, the gain is restored by 3 dB=−3−(−6).

Accordingly, in order to suppress optical surges to a much higher extent, it is only necessary to set the threshold value for laser operations close to an ordinary input intensity. However, in practice, the optical amplifier requires an input dynamic range, and therefore optical surges corresponding to the input dynamic range occurs.

Particularly, the optical post amplifier of the present invention has a narrower input dynamic range compared to that of other optical amplifiers, and therefore the present optical surge suppression method becomes effective.

In order to study an increase/decrease in the relative intensity noise (RIN) according to the presence/absence of the laser resonator, a narrow-band optical filer for permitting passage of an signal light was provided on the output side of the optical amplifier, and an increase/decrease in the RIN of output light was measured when the fiber gratings forming the resonator was removed from the optical amplifier.

The resultant RIN of the output light was −148.0 dB/Hz, and there was no substantial difference in RIN between the case where there was the laser resonator and the case where there was not the laser resonator. This means that the reflectances of the fiber gratings are large for the 1530 nm band but does not affect light of the signal light wavelength.

Figure 34A:
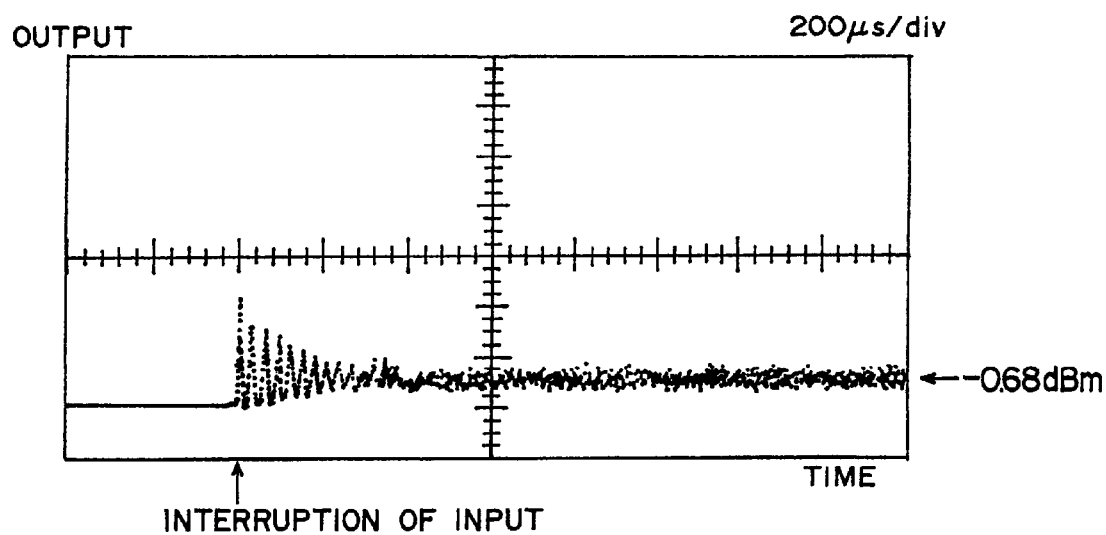
FIGS. 34(a) and 34(b) are illustrative plots showing output waveforms of a laser beam.
Figure 34B:
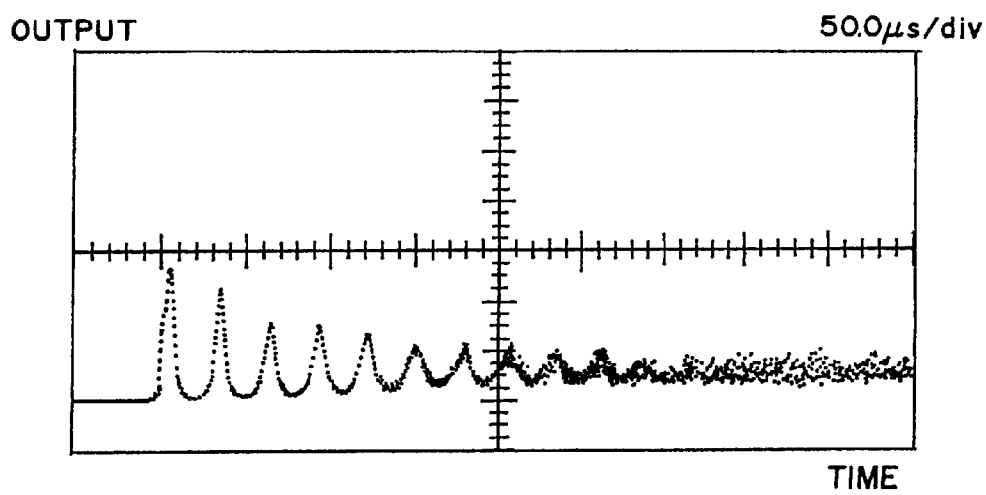
Figure 35:
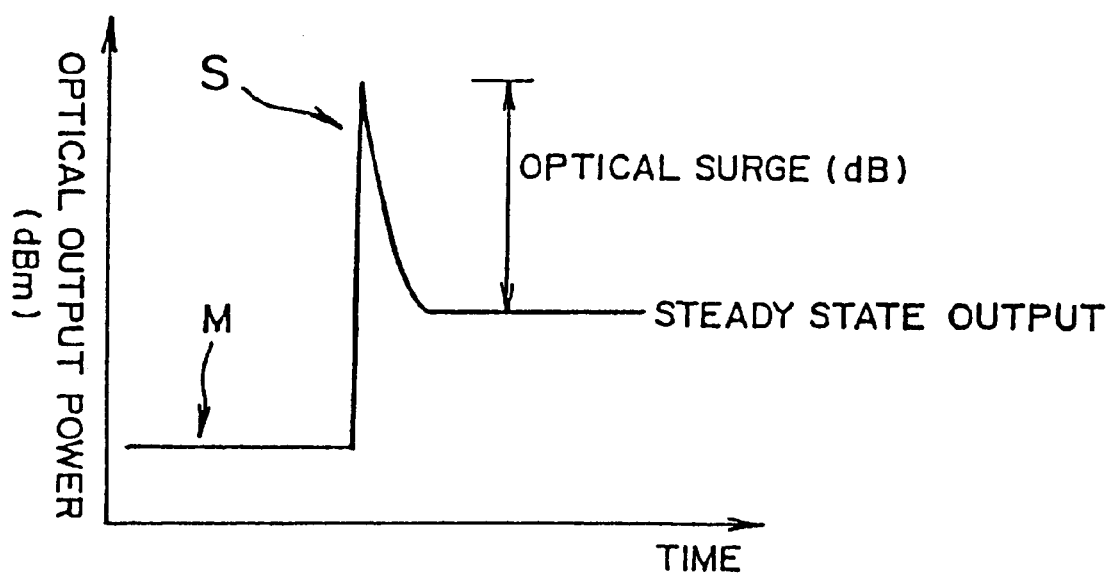
FIG. 35 is an illustrative plot showing an optical surge that is generated in an optical amplifier.

As a result of measurement of the laser light by extracting only the laser light through use of the narrow-band optical filer (BPF), a relaxed output oscillation waveform as illustrated in FIGS. 34(a) and 34(b) was obtained. FIG. 34(b) illustrates the same waveform as in FIG. 34(a), but its time axis is enlarged.

There is a rise in the laser light within several microseconds after an input signal has been interrupted. The cycle of relaxed oscillations is about 30 μs and is shorter when compared to the relaxation time (10 ms) of the BPF. Therefore, EDFAs provided in a downstream direction respond to the light obtained as a result of mathematical integration of the laser light in a period of time substantially equal to the relaxation time.

Consequently, it is considered that this laser light has a large effect of preventing the gain of the EDFAs provided in the downstream direction from recovering from the saturated level.

The EDFA 66 illustrated in FIG. 28 uses the intensity branch couplers; i.e., the 9-to-1 optical branch couplers, as the optical couplers 58 and 60 for connecting the fiber grating reflection mirrors 63 and 64. However, if wavelength division multiplexing couplers are used, the oscillated light bouncing back and forth within the EDFA 66 can be prevented from emerging from an input port of the EDFA 66. Further, an insertion loss at the signal light wavelength can be reduced, thereby reducing the noise factor of the EDFA 66.

(4) Conclusion

The previous descriptions disclose the capability of suppressing optical surges through laser operations in the 1530 nm band at which the gain of the amplifier is quickly restored from the saturated level in response to a reduction in the intensity of the input signal light.

What is claimed is:

1. An optical amplifier having an amplifying medium for amplifying input light through use of an excitation energy of pumping light and for outputting the amplified light, said optical amplifier comprising:

a pumping light source for generating the pumping light;

a pumping light incident coupler which introduces the pumping light emitted from said pumping light source into one end of said amplifying medium;

reflecting members which are respectively disposed on the input and output sides of said amplifying medium and are capable of reflecting light with a predetermined optical wavelength different from a signal light wavelength contained in the input light; and a branch coupler for branching an optical signal received from said amplifying medium, said branch coupler being interposed between said amplifying medium and one of said reflecting members, either that connected to the input side of said amplifying medium or that connected to the output side of said amplifying medium.

2. An optical amplifier according to claim 1, wherein the reflectances of said reflecting members connected to the input and output sides of said amplifying medium are set such that said amplifying medium has a gain that enables suppression of optical surges.

3. An optical amplifier according to claim 2, wherein the reflectance of said reflecting member connected to the input side of said amplifying medium is set so as to become higher than that of said reflecting member connected to the output side of said amplifying medium.

4. An optical amplifier according to claim 1, wherein in order that said amplifying medium has a gain that enables suppression of optical surges, there is provided an attenuator which attenuates the optical signal bifurcated by said branch coupler to a predetermined level and outputs the attenuated optical signal to said reflecting member that is disposed on the side of said branch coupler.

5. An optical amplifier according to claim 4, wherein said attenuator is formed from a variable attenuator.

6. An optical amplifier according to claim 1, wherein said pumping light incident coupler is formed from a wavelength division multiplexing coupler.

7. An optical amplifier according to claim 1, wherein said amplifying medium is formed from rare-earth-element-doped fibers.

8. An optical amplifier according to claim 7, wherein said rare-earth-element-doped fiber is made from an erbium-doped fiber.

9. An optical amplifier according to claim 1, wherein said branch coupler is formed from a wavelength division multiplexing coupler which separates light with a signal light wavelength, through wavelength division multiplexing, from light with a predetermined optical wavelength that is reflected by said reflecting members.

10. An optical amplifier having an amplifying medium for amplifying input light through use of the excitation energy of pumping light and for outputting the amplified light, said optical amplifier comprising:
   a pumping light source for generating the pumping light;
   a pumping light incident coupler which introduces the pumping light emitted from said pumping light source into one end of said amplifying medium;
   a branch coupler disposed on the input side of said amplifying medium for causing an optical signal sent to said amplifying medium to branch so as to be output as a first branch signal and for causing an optical signal received from said amplifying medium to branch so as to be output as a second branch signal;
   reflecting members capable of reflecting light with a predetermined optical wavelength different from a signal light wavelength contained in the input light, one of which is connected to the input side of said amplifying medium with said branch coupler interposed between them, and the other one of which is connected to the output side of said amplifying medium;
   an input monitor for monitoring the light input to said amplifying medium on the basis of the first branch signal received from said branch coupler; and
   a variable attenuator for attenuating the second branch signal received from said branch coupler to a predetermined level and for outputting the attenuated second branch signal to said reflecting member disposed on the side of said branch coupler,
   wherein, if the intensity of the input light decreases to a value lower than a preset threshold value, the amount of attenuation of the second branch signal at said variable attenuator is controlled on the basis of input light monitor information received from said input monitor in such a way that the gain of said amplifying medium decreases to a value lower than a predetermined value.

11. An optical amplifier according to claim 10, wherein said optical amplifier is provided with a filter for permitting transmission of only light with the signal light wavelength included in the first branch signal received from said branch coupler and outputting the light to said input monitor.

12. An optical amplifier having an amplifying medium for amplifying input light through use of the excitation energy of pumping light and for outputting the amplified light, said optical amplifier comprising:
   a pumping light source for generating the pumping light;
   a pumping light incident coupler which introduces the pumping light emitted from said pumping light source into one end of said amplifying medium;
   a first branch coupler disposed on the input side of said amplifying medium for causing an optical signal sent to said amplifying medium to branch so as to be output as a first branch signal;
   a second branch coupler connected to the output side of said first branch coupler for causing an optical signal received from said amplifying medium to branch so as to be output as a second branch signal;
   reflecting members capable of reflecting light with a predetermined optical wavelength different from a signal light wavelength contained in the input light, one of which is connected to the input side of said amplifying medium with said second branch coupler interposed between them, and the other one of which is connected to the output side of said amplifying medium;
   an input monitor for monitoring the light input to said amplifying medium on the basis of the first branch signal received from said first branch coupler; and
   a variable attenuator for attenuating the second branch signal received from said second branch coupler to a predetermined level and for outputting the attenuated second branch signal to said reflecting members disposed on the side of said second branch coupler,
   wherein, if the intensity of the input light decreases to a value lower than a preset threshold value, the amount of attenuation of the second branch signal at said variable attenuator is controlled on the basis of input light monitor information received from said input monitor in such a way that the gain of said amplifying medium decreases to a value lower than a predetermined value.

13. An optical amplifier according to claim 12, wherein said second branch coupler is formed from a wavelength division multiplexing coupler which separates light with a signal light wavelength, through wavelength division multiplexing, from light with a predetermined optical wavelength that is reflected by said reflecting members.

14. An optical amplifier according to claim 1, wherein when the input light has a low power level, the gain of said optical amplifying medium at an optical wavelength that is reflected by said reflecting members is higher than that at the signal light wavelength.

15. An optical amplifier according to claim 1, wherein when the input light has a low power level, the gain of said optical amplifying medium at an optical wavelength that is reflected by said reflecting members is higher than that at the signal light wavelength.

16. An optical amplifier according to claim 10, wherein when the input light has a low power level, the gain of said optical amplifying medium at an optical wavelength that is reflected by said reflecting members is higher than that at the signal light wavelength.

17. An optical amplifier according to claim 12, wherein when the input light has a low power level, the gain of said optical amplifying medium at an optical wavelength that is reflected by said reflecting members is higher than that at the signal light wavelength.

18. An optical amplifier according to claim 1, wherein each of said reflecting members is formed from a fiber grading.

19. An optical amplifier according to claim 1, wherein each of said reflecting members is formed from a fiber grading.

20. An optical amplifier according to claim 10, wherein each of said reflecting members is formed from a fiber grading.

21. An optical amplifier according to claim 12, wherein each of said reflecting members is formed from a fiber grading.

22. An optical amplifier according to claim 1, wherein an isolator is added to each of an input port to which the input light is input and an output port from which output light is output.

23. An optical amplifier according to claim 1, wherein an isolator is added to each of an input port to which the input light is input and an output port from which output light is output.

24. An optical amplifier according to claim 10, wherein an isolator is added to each of an input port to which the input light is input and an output port from which output light is output.

25. An optical amplifier according to claim 12, wherein an isolator is added to each of an input port to which the input light is input and an output port from which output light is output.

26. An optical amplifier according to claim 1, wherein a filter is provided at an output port from which output light is output, said filter permitting transmission of only light with the signal light wavelength while eliminating light with a wavelength that can be reflected by said reflecting members.

27. An optical amplifier according to claim 1, wherein a filter is provided at an output port from which output light is output, said filter permitting transmission of only light with the signal light wavelength while eliminating light with a wavelength that can be reflected by said reflecting members.

28. An optical amplifier according to claim 10, wherein a filter is provided at an output port from which output light is output, said filter permitting transmission of only light with the signal light wavelength while eliminating light with a wavelength that can be reflected by said reflecting members.

29. An optical amplifier according to claim 12, wherein a filter is provided at an output port from which output light is output, said filter permitting transmission of only light with the signal light wavelength while eliminating light with a wavelength that can be reflected by said reflecting members.

30. An optical amplifying apparatus including at least two stages of optical amplifiers, each of which has an amplifying medium for amplifying input light through use of the excitation energy of pumping light and for outputting the amplified light, wherein said optical amplifier provided in the first stage comprises:

a pumping light source for generating the pumping light;

a pumping light incident coupler which introduces the pumping light emitted from said pumping light source into one end of the amplifying medium;

a branch coupler connected to at least one of the input and output sides of said amplifying medium for causing an optical signal received from said amplifying medium to branch;

reflecting members which are respectively connected to the input and output sides of said amplifying medium and are capable of reflecting light with a predetermined optical wavelength different from a signal light wavelength contained in the input light, said branch coupler being interposed between the input or output side of said amplifying medium and one of said reflecting member; and said reflecting member connected to the input side of said amplifying medium having a reflectance higher than that of said reflecting member connected to the output side of said amplifying medium.

31. An optical transmitter for use in an optical communications system which outputs an optical signal amplified by an optical output amplifier, wherein said output amplifier comprises:

an amplifying medium for amplifying input light through use of the excitation energy of pumping light and for outputting the amplified light;

a pumping light source for generating the pumping light;

a pumping light incident coupler which introduces the pumping light emitted from said pumping light source into one end of said amplifying medium;

a branch coupler for causing bifurcation of an optical signal received from said amplifying medium which is connected to the input side of said amplifying medium or to the output side thereof; and reflecting members which are respectively connected to the input and output sides of said amplifying medium and are capable of reflecting light with a predetermined optical wavelength different from a signal light wavelength contained in the input light, said branch coupler being interposed between one of said reflecting members and the input or output side of said amplifying medium.

32. A method of suppressing optical surges in an optical amplifier, comprising the steps of:

receiving input light, which contains signal light having a predetermined wavelength and other light having a wavelength different from said predetermined wavelength, amplifying said signal light using excitation energy of pumping light and an optical amplifier having an amplifying medium from an optical amplifier having an amplifying medium which amplifies the input light and then outputting from the amplifying medium the resultant light, which contains amplified signal light and the other light having a wavelength different from said predetermined wavelength of said signal light;

detecting a level of said input light; and discharging excitation energy accumulated in said amplifying medium by oscillating said other light on an optical path passing through said amplifying medium if a reduced intensity is detected during the detecting step.

33. A method of suppressing optical surges in an optical amplifier according to claim 32, wherein, in said discharging, said other light is controlled in such a way that the gain of said amplifying medium becomes lower than a gain at which optical surges occur.

* * * * *

UNITED STATES PATENT AND TRADEMARK OFFICE
CERTIFICATE OF CORRECTION

PATENT NO.:    6,172,801
DATED      :   January 9, 2001
INVENTOR(S):   Miki TAKEDA, et al.

It is certified that errors appears in the above-identified patent and that said Letters Patent is hereby corrected as shown below:

Column 40, line 40: Delete "from an optical amplifier having an amplifying medium which amplifies the input light".

(56) References Sited
Change "23044852" to --2304452--.

Signed and Sealed this

Eighth Day of May, 2001

*Attest:*

NICHOLAS P. GODICI

*Attesting Officer*     Acting Director of the United States Patent and Trademark Office